US011061720B2

(12) United States Patent
Stankevichus et al.

(10) Patent No.: US 11,061,720 B2
(45) Date of Patent: Jul. 13, 2021

(54) PROCESSING SYSTEM AND METHOD OF DETECTING CONGESTION IN PROCESSING SYSTEM

(71) Applicant: YANDEX EUROPE AG, Lucerne (CH)

(72) Inventors: Aleksey Alekseevich Stankevichus, Moscow (RU); Sergey Vladimirovich Trifonov, Moscow (RU)

(73) Assignee: YANDEX EUROPE AG, Lucerne (CH)

(*) Notice: Subject to any disclaimer, the term of this patent is extended or adjusted under 35 U.S.C. 154(b) by 171 days.

(21) Appl. No.: 16/384,301

(22) Filed: Apr. 15, 2019

(65) Prior Publication Data

US 2020/0089530 A1 Mar. 19, 2020

(30) Foreign Application Priority Data

Sep. 14, 2018 (RU) .............................. RU2018132718

(51) Int. Cl.
*G06F 9/46* (2006.01)
*G06F 9/48* (2006.01)
(52) U.S. Cl.
CPC .................. *G06F 9/4881* (2013.01)
(58) Field of Classification Search
CPC ...................................................... G06F 9/4881
(Continued)

(56) References Cited

U.S. PATENT DOCUMENTS 5,247,677 A 9/1993 Welland et al.
5,278,984 A 1/1994 Batchelor
(Continued)

FOREIGN PATENT DOCUMENTS

CN 105653365 A 6/2016
CN 103514037 B 6/2018
(Continued)

OTHER PUBLICATIONS

Russian Search Report dated Nov. 8, 2019 issued in respect of the Russian Patent Application No. RU2018132711.
(Continued)

*Primary Examiner* — Evral E Bodden
(74) *Attorney, Agent, or Firm* — BCF LLP

(57) ABSTRACT

A method of detecting congestion in a computer system. The computer system has a task source for generating a stream of computer-implemented tasks and a plurality of processing nodes arranged in a sequence and forming a processing pipeline for processing the stream of computer-implemented tasks, each one of the plurality of processing nodes having a respective system-unique identifier (SUID). The method is executable by the computer system. The method includes receiving a task packet by a given processing node, the task packet having a task body indicative of a respective computer-implemented task, and a writable congestion-indicating field; processing the task body of the task packet; determining a presence of an input queue of more than one task packet at the given processing node; and in response to the determining the presence of the input queue, updating the writable congestion-indicating field with the SUID of the given processing node.

19 Claims, 10 Drawing Sheets

(58) Field of Classification Search
USPC ........................................................ 718/102
See application file for complete search history.

(56) References Cited

U.S. PATENT DOCUMENTS

| | | | |
|---|---|---|---|
| 5,577,202 A | 11/1996 | Padgett | |
| 5,640,563 A | 6/1997 | Carmon | |
| 5,845,316 A | 12/1998 | Hillyer et al. | |
| 6,023,720 A | 2/2000 | Aref et al. | |
| 6,256,755 B1 | 7/2001 | Hook et al. | |
| 6,553,472 B2 | 4/2003 | Yang et al. | |
| 6,757,897 B1 | 6/2004 | Shi et al. | |
| 6,791,992 B1 | 9/2004 | Yun et al. | |
| 6,851,115 B1 | 2/2005 | Cheyer et al. | |
| 6,859,931 B1 | 2/2005 | Cheyer et al. | |
| 7,073,021 B2 | 7/2006 | Iren et al. | |
| 7,177,866 B2 | 2/2007 | Holenstein et al. | |
| 7,474,989 B1 | 1/2009 | Wilcoxon | |
| 7,562,362 B1 | 7/2009 | Paquette et al. | |
| 7,971,093 B1 | 6/2011 | Goel et al. | |
| 8,037,024 B1 | 10/2011 | Bozkaya et al. | |
| 8,117,621 B2 | 2/2012 | Singh et al. | |
| 8,145,838 B1 | 3/2012 | Miller et al. | |
| 8,254,172 B1 | 8/2012 | Kan et al. | |
| 8,595,302 B2 | 11/2013 | Krishnamurthi et al. | |
| 8,799,913 B2 | 8/2014 | Yoo et al. | |
| 8,826,301 B2 | 9/2014 | Kim et al. | |
| 8,838,539 B1 | 9/2014 | Ashcraft et al. | |
| 8,850,018 B2 | 9/2014 | Massa et al. | |
| 8,850,446 B2 | 9/2014 | Avni et al. | |
| 8,930,954 B2 | 1/2015 | Hildrum et al. | |
| 8,966,490 B2 | 2/2015 | Avni et al. | |
| 9,037,826 B1 | 5/2015 | Brooker et al. | |
| 9,047,331 B2 | 6/2015 | Rao et al. | |
| 9,093,160 B1 | 7/2015 | Ellis et al. | |
| 9,203,900 B2 | 12/2015 | Rao et al. | |
| 9,251,195 B2 | 2/2016 | Yamada | |
| 9,304,694 B2 | 4/2016 | Colgrove et al. | |
| 9,348,592 B2 | 5/2016 | Jha | |
| 9,354,813 B1 | 5/2016 | Dolan et al. | |
| 9,400,682 B2 | 7/2016 | Persikov et al. | |
| 9,477,521 B2 | 10/2016 | Truong et al. | |
| 9,489,443 B1 | 11/2016 | Muniswamy-Reddy et al. | |
| 9,547,528 B1* | 1/2017 | McClure | G06F 9/4881 |
| 9,569,339 B1 | 2/2017 | Villalobos et al. | |
| 9,639,396 B2 | 5/2017 | Pho et al. | |
| 9,699,017 B1 | 7/2017 | Gupta et al. | |
| 9,811,391 B1* | 11/2017 | Barrett | G16B 30/10 |
| 9,921,557 B2 | 3/2018 | Slupik et al. | |
| 10,552,215 B1 | 2/2020 | Xu et al. | |
| 10,572,323 B1 | 2/2020 | Zhai et al. | |
| 2002/0099756 A1 | 7/2002 | Catthoor et al. | |
| 2003/0115410 A1 | 6/2003 | Shriver | |
| 2004/0213387 A1 | 10/2004 | Chandrasekaran | |
| 2005/0047425 A1 | 3/2005 | Liu et al. | |
| 2007/0002750 A1 | 1/2007 | Sang et al. | |
| 2007/0226332 A1 | 9/2007 | Becker-Szendy et al. | |
| 2007/0268516 A1 | 11/2007 | Bugwadia et al. | |
| 2007/0282660 A1* | 12/2007 | Forth | G06Q 10/10 705/7.15 |
| 2008/0049633 A1* | 2/2008 | Edwards | H04L 43/10 370/252 |
| 2008/0168452 A1 | 7/2008 | Molaro et al. | |
| 2008/0320482 A1 | 12/2008 | Dawson et al. | |
| 2009/0013154 A1 | 1/2009 | Du et al. | |
| 2009/0292744 A1 | 11/2009 | Matsumura | |
| 2009/0300449 A1 | 12/2009 | Qian et al. | |
| 2010/0011182 A1 | 1/2010 | Le Moal et al. | |
| 2010/0035581 A1 | 2/2010 | Park et al. | |
| 2010/0185847 A1 | 7/2010 | Shasha et al. | |
| 2011/0145830 A1 | 6/2011 | Yamaguchi | |
| 2011/0153566 A1 | 6/2011 | Larson et al. | |
| 2011/0196834 A1 | 8/2011 | Kesselman et al. | |
| 2011/0219100 A1 | 9/2011 | Dhuse et al. | |
| 2011/0261698 A1 | 10/2011 | Kamerkar et al. | |
| 2011/0314070 A1 | 12/2011 | Brown et al. | |
| 2012/0046807 A1 | 2/2012 | Ruther et al. | |
| 2012/0047317 A1 | 2/2012 | Yoon et al. | |
| 2012/0066449 A1 | 3/2012 | Colgrove et al. | |
| 2012/0124273 A1 | 5/2012 | Goss et al. | |
| 2012/0204265 A1 | 8/2012 | Judge | |
| 2012/0278801 A1 | 11/2012 | Nelson et al. | |
| 2013/0042156 A1 | 2/2013 | Srinivasan et al. | |
| 2013/0132057 A1 | 5/2013 | Deng et al. | |
| 2013/0191836 A1 | 7/2013 | Meyer | |
| 2013/0227186 A1 | 8/2013 | Laughton | |
| 2013/0326161 A1 | 12/2013 | Cohen et al. | |
| 2014/0019987 A1 | 1/2014 | Verma et al. | |
| 2014/0074623 A1 | 3/2014 | Mohammadi et al. | |
| 2014/0157276 A1 | 6/2014 | Smithson et al. | |
| 2014/0208327 A1 | 7/2014 | Cadambi et al. | |
| 2014/0226565 A1 | 8/2014 | Velev et al. | |
| 2014/0250438 A1 | 9/2014 | Shin et al. | |
| 2014/0282572 A1 | 9/2014 | Kang | |
| 2014/0304601 A1 | 10/2014 | Rossano et al. | |
| 2015/0127625 A1 | 5/2015 | Bulkowski et al. | |
| 2015/0128149 A1 | 5/2015 | Meijer et al. | |
| 2015/0237157 A1 | 8/2015 | Wang et al. | |
| 2015/0347185 A1 | 12/2015 | Holt et al. | |
| 2015/0347211 A1 | 12/2015 | Dang et al. | |
| 2015/0347554 A1 | 12/2015 | Vasantham et al. | |
| 2016/0149964 A1 | 5/2016 | Pastro | |
| 2016/0188376 A1 | 6/2016 | Rosas et al. | |
| 2016/0266934 A1 | 9/2016 | Rimoni | |
| 2016/0291885 A1 | 10/2016 | Pendharkar et al. | |
| 2017/0017676 A1 | 1/2017 | Levy et al. | |
| 2017/0031713 A1 | 2/2017 | Campbell et al. | |
| 2017/0048021 A1 | 2/2017 | Yanovsky et al. | |
| 2017/0109203 A1 | 4/2017 | Liu et al. | |
| 2017/0147488 A1 | 5/2017 | Vaquero | |
| 2017/0177697 A1 | 6/2017 | Lee et al. | |
| 2017/0308403 A1 | 10/2017 | Turull et al. | |
| 2017/0374516 A1 | 12/2017 | Huo et al. | |
| 2018/0006999 A1 | 1/2018 | Doukhvalov et al. | |
| 2018/0041477 A1 | 2/2018 | Shaposhnik | |
| 2018/0052710 A1 | 2/2018 | Choi et al. | |
| 2018/0101448 A1 | 4/2018 | Ventura et al. | |
| 2018/0114290 A1 | 4/2018 | Paltashev et al. | |
| 2018/0157543 A1 | 6/2018 | Bellomo et al. | |
| 2018/0260125 A1 | 9/2018 | Botes et al. | |
| 2018/0293123 A1 | 10/2018 | Kondapalli et al. | |
| 2018/0300385 A1 | 10/2018 | Merriman et al. | |
| 2019/0163546 A1 | 5/2019 | Ungar et al. | |
| 2019/0171763 A1 | 6/2019 | Cai et al. | |
| 2019/0199515 A1 | 6/2019 | Carver et al. | |
| 2019/0392061 A1 | 12/2019 | Terry et al. | |
| 2020/0074416 A1 | 3/2020 | Mathew | |
| 2020/0252761 A1 | 8/2020 | Podluzhny | |

FOREIGN PATENT DOCUMENTS

| | | |
|---|---|---|
| EA | 031078 B1 | 11/2018 |
| EP | 2110990 A1 | 10/2009 |
| EP | 1508850 A3 | 3/2015 |
| GB | 2351375 A | 12/2000 |
| RU | 2273105 C2 | 3/2006 |
| RU | 2376635 C2 | 12/2009 |
| RU | 2388039 C2 | 4/2010 |
| RU | 2494453 C2 | 9/2013 |
| RU | 2533638 C2 | 11/2014 |
| RU | 2543558 C2 | 3/2015 |
| RU | 2547705 C2 | 4/2015 |
| RU | 2581551 C2 | 4/2016 |
| RU | 2628146 C2 | 8/2017 |
| RU | 2649788 C1 | 4/2018 |
| RU | 2665212 C2 | 8/2018 |
| RU | 2670573 C2 | 10/2018 |
| WO | 2012065018 A2 | 5/2012 |
| WO | 2016197716 A1 | 12/2016 |

OTHER PUBLICATIONS

Russian Search Report dated Nov. 26, 2019 issued in respect of the Russian Patent Application No. RU2018144176.

(56) References Cited

OTHER PUBLICATIONS

Russian Search Report dated Nov. 26, 2019 issued in respect of the Russian Patent Application No. RU2018132714.
Russian Search Report dated Nov. 25, 2019 issued in respect of the Russian Patent Application No. RU2018135452.
Ex Parte Quale Action dated Apr. 23, 2020 received in respect of a related U.S. Appl. No. 16/383,976.
Russian Search Report dated Oct. 30, 2019 issued in respect of the Russian Patent Application No. RU2018136221.
Grefen et al. "Two-Layer Transaction Management for Workflow Management Applications", Database and Expert Systems Applications, pp. 430-439, publication date: Sep. 1997430-439.
"Deadline scheduler", retrieved on Wikipedia on Jan. 21, 2019.
"Shortest seek first", retrieved on Wikipedia on Jan. 21, 2019.
"Elevator algorithm", retrieved on Wikipedia on Jan. 21, 2019.
Abeni et al, "Constant Bandwidth Server Revisited", EWiLi'14, Nov. 2014, Lisbon, Portugal.
Virtuozzo Storage 2.3, Installation Guide, Dec. 14, 2017, retrieved from https://docs.virtuozzo.com/virtuozzo_storage_2_installation_guide/planning-virtuozzo-storage-infrastructure/understanding-data-redundancy.html.
Notice of Allowance dated Oct. 15, 2020 received in respect of a related U.S. Appl. No. 16/433,186.
Kumar et al, "Optimized Particle Swarm Optimization Based Deadline Constrained Task Scheduling in Hybrid Cloud", ICTACT Journal of Soft Computing, Jan. 2016, vol. 06, Issue 02, pp. 1117-1122 (Year: 2016).
Shin et al, "Deadline-Guaranteed Scheduling Algorithm with Improved Resource Utilization for Cloud Computing", 12th Annual IEEE Consumer Communications and Networking Conference (CCNC), 2015, pp. 814-819 (Year: 2015).
Chopra et al, "Deadline and Cost based Workflow Scheduling in Hybrid Cloud", 2013, IEEE, pp. 840-846 (Year: 2013).
Yuan et al, "Deadline divison-based heuristic for cost optimization in workflow scheduling". Information Sciences 179 (2009) 2562-2575, Elsevier, pp. 2562-2575 (Year 2009).
Srinivasan et al, "Deadline-based scheduling of periodic task systems on multiprocessors", Information Processing Letters 84 (2002), 93-98, Elsevier, pp. 93-98 (Year 2002).
Ruemmier "An Introduction to Disk Drive Modeling", Hewlett Packard Laboratories, IEEE, Mar. 1994, pp. 17-29 (Year 1994).
IEEE 100, The Authoritative Dictionary of IEEE Standards Terms, Seventh Edition, IEEE Press, 2000, pp. 245, 1184 (Year: 2000).
Office Action dated Nov. 12, 2020 received in respect of a related U.S. Appl. No. 16/367,537.
Office Action dated Nov. 20, 2020 received in respect of a related U.S. Appl. No. 16/776,011.
Ex Parte Quale Action dated Oct. 22, 2020 received in respect of a related U.S. Appl. No. 16/560,409.
Office Action dated Oct. 23, 2020 received in respect of a related U.S. Appl. No. 16/504,040.
Russian Search Report dated Feb. 25, 2020 issued in respect of the Russian Patent Application No. RU2018147497.
Russian Search Report dated Feb. 25, 2010 issued in respect of the Russian Patent Application No. RU2018135460.
Notice of Allowance dated Mar. 23, 2021 received in respect of a related U.S. Appl. No. 16/574,277.
Office Action dated Mar. 10, 2021 received in respect of a related U.S. Appl. No. 16/367,537.
Russian Search Report dated Jan. 18, 2021 issued in respect of the Russian Patent Application No. RU2019103253.
Office Action dated Dec. 4, 2020 received in respect of a related U.S. Appl. No. 16/401,688.
Notice of Allowance dated May 18, 2021 received in respect of a related U.S. Appl. No. 16/401,688.

* cited by examiner

PROCESSING SYSTEM AND METHOD OF DETECTING CONGESTION IN PROCESSING SYSTEM

CROSS-REFERENCE

The present application claims priority to Russian Patent Application No. 2018132718, entitled "Processing System and Method of Detecting Congestion in the Processing System," filed Sep. 14, 2018, the entirety of which is incorporated herein by reference.

TECHNICAL FIELD

The present technology relates to methods and systems for detecting congestion in a processing system.

BACKGROUND

Many systems require sequential processing of data, performed by a sequence of processing entities. This sequence of processing entities forms a "pipeline" for processing the data. In the case of a distributed storage system, where various tasks are transmitted between various entities, many such task pipelines may be configured for processing.

In an ideal pipeline, tasks submitted to the pipeline in a stream are processed one after the other, no task input queues are formed at the processing entities, and each processing entity of the pipeline deals with no more than one task at a time.

In many cases, however, processing entities have different processing characteristics and as such the processing entities along the pipeline may require different amounts of time for processing a given task. Hence, tasks queues may form at a given processing entity, resulting in a congestion in the pipeline. This is known as a "bottleneck" problem, where processing entities requiring more time for processing a given task slow down the overall flow through the processing pipeline.

One solution to such a problem is monitoring the queues of each processing entity. This often requires information to be sent from each processing entity to a central supervising computer system, which information is embodied in some sort of a control message each processing entity must produce in addition to the processing task to be processed by the processing entity. This generally creates additional data to be treated by the system and additional work for each processing entity, creating another possibility for further slowing the processing pipeline.

Another solution for rectifying this "bottleneck" problem is to employ additional software at each processing entity for monitoring queues and thus the pipeline slowdown. This solution similarly increases the complexity of the system, and will generally require an additional amount of overhead resources for running such software.

There is therefore a need for methods for determining or monitoring congestion in a processing pipeline without at least some of the inconveniences of the above described methods.

SUMMARY

It is an object of the present to ameliorate at least some of the inconveniences present in the prior art.

According to one aspect of the present technology, there is provided a system and method for determining congestion in a sequential processing pipeline. The processing pipeline processes a stream of computer-implemented tasks. The processing pipeline is formed by a plurality of processing nodes arranged in a sequence. Each processing node has a system-unique identifier (SUID). As a task packet is processed by each node sequentially through the pipeline, the SUID of each node is written to a writable congestion-indicating field when that given node has a queue of tasks waiting to be processed. Each time the task packet encounters a node with a queue, the SUID of that node replaces any earlier SUID in the congestion-indicating field. In this way, the congestion-indicating field of the task packet contains the SUID of the most down-stream node causing congestion when the task packet exits the processing pipeline. The distributed processing system can then collect statistics over time to determine the most common node to be indicated as the most down-stream congestion causing node. Based on those statistics, the system can then adjust one or more of the parameters of that node, in order to reduce the congestion in the processing pipeline. With such a system and method, a particular processing node causing congestion in the processing pipeline can be identified with: no additional software applications, little overhead additional processing and energy, and with only a small addition of information to a task packet being processed by the pipeline. This can lead, in some circumstances, to a decrease in processing time in the pipeline and reduced energy usage compared to some other methods for managing congestion in a processing pipeline. This can be especially advantageous for distributed processing systems, where many processing pipelines are likely to be implemented, and congestion management costs (in energy, bandwidth, etc.) multiply across the system.

According to another aspect of the present technology, there is provided a method of detecting congestion in a computer system, the computer system having a task source for generating a stream of computer-implemented tasks to be processed by the computer system, and a plurality of processing nodes arranged in a sequence and forming a processing pipeline for processing the stream of computer-implemented tasks, each one of the plurality of processing nodes having a respective system-unique identifier (SUID). The method is executable by the computer system and includes receiving, by a given processing node of the plurality of processing nodes, a task packet, the given processing node being a sequential processing node after a previous processing node of the processing pipeline, the task packet having a task body indicative of a respective computer-implemented task, and a writable congestion-indicating field; processing, by the given processing node, the task body of the task packet; determining, by the given processing node, a presence of a respective input queue at the given processing node, the input queue comprising more than one task packet; and in response to the determining the presence of the respective input queue at the given processing node, updating, by the given processing node, the writable congestion-indicating field with the respective SUID of the given processing node.

In some implementations, the determining the presence of the respective input queue is executed after the processing of the task body by the given processing node.

In some implementations, the method further includes processing, by the previous processing node, the task packet, the processing including generating, by the previous processing node, the writable congestion-indicating field; and appending, by the previous processing node, the writable congestion-indicating field to the task body.

In some implementations, the processing the task packet further includes determining, by the previous processing node, a presence of a respective input queue at the previous processing node; and in response to the determining the presence of the respective input queue at the previous processing node, inserting, by the previous processing node, into the writable congestion-indicating field the respective SUID of the previous processing node.

In some implementations, the generating, by the previous processing node, the writable congestion-indicating field is executed only in response to the determining the presence of the respective input queue at the previous processing node.

In some implementations, the method further includes receiving, by a next processing node of the plurality of processing nodes, the task packet, the next processing node being a sequential processing node after the given processing node of the processing pipeline; processing, by the next processing node, the task body of the task packet determining, by the next processing node, a presence of a respective input queue at the next processing node; and in response to the determining the presence of the respective input queue at the next processing node, updating, by the next processing node, the writable congestion-indicating field with the respective SUID of the next processing node.

In some implementations, the method further includes reading, by the computer system, the writable congestion-indicating field of the task packet having exited the processing pipeline, thereby identifying a last-written SUID having been written into the writable congestion-indicating field, the last-written SUID being indicative of a most-downstream processing node of the plurality of processing nodes causing congestion in the processing pipeline.

In some implementations, the method further includes recording over a pre-determined period of time, by the computer system, indications of last-written SUIDs of task packets having exited the processing pipeline.

In some implementations, the method further includes identifying, by the computer system, a most common last-written SUID amongst tracked last-written SUIDs; and generating, by the computer system, a message including the most common last-written SUID, the message aiding in resolving congestion caused by a respective processing node associated with the most common last-written SUID.

In some implementations, the computer system further includes a supervisory computer; and the method further includes reading, by the supervisory computer, the writable congestion-indicating field of the task packet having exited the processing pipeline, thereby identifying a last-written SUID having been written into the writable congestion-indicating field, the last-written SUID being indicative of a most-downstream processing node of the plurality of processing nodes causing congestion in the processing pipeline.

In some implementations, the computer system further includes a plurality of processing pipelines; and the method further includes recording over a pre-determined period of time, by the supervisory computer, indications of last-written SUIDs of task packets exiting each one of the plurality of processing pipelines.

In some implementations, the identifying the most common last-written SUID recorded to the congestion statistics includes identifying a most frequently recorded last-written SUID over the pre-determined period of time.

In some implementations, the plurality of processing nodes includes at least one of a plurality of software-implemented nodes, a plurality of hardware-implemented nodes, and a plurality of storage devices.

According to another aspect of the present technology, there is provided a method of resolving congestion caused by a specific processing node in a computer system. The computer system includes a plurality of processing nodes organized in series for sequential processing, each one of the plurality of nodes having a system-unique identifier, a task source for generating a plurality of computer-implemented tasks to be processed by the plurality of nodes, and a supervisory computer, the method being executable at the supervisory computer, the method including collecting congestion statistics of the plurality of processing nodes over a pre-determined period of time, the collecting being executed by repeating, over the pre-determined period of time, the steps of receiving, by a given processing node of the plurality of processing nodes, a task packet, the given processing node being a sequential processing node after a previous processing node of the processing pipeline, the task packet having: a task body indicative of a respective computer-implemented task, and a writable congestion-indicating field; processing, by the given processing node, the task body of the task packet; determining, by the given processing node, a presence of a respective input queue at the given processing node, the input queue comprising more than one task packet; in response to the determining the presence of the respective input queue at the given processing node, updating, by the given processing node, the writable congestion-indicating field with the respective SUID of the given processing node; receiving, by a next processing node of the plurality of processing nodes, the task packet, the next processing node being a sequential processing node after the given processing node of the processing pipeline; processing, by the next processing node, the task body of the task packet; determining, by the next processing node, a presence of a respective input queue at the next processing node; and in response to the determining the presence of the respective input queue at the next processing node, updating, by the next processing node, the writable congestion-indicating field with the respective SUID of the next processing node; reading, by the supervisory computer, the writable congestion-indicating field of the task packet having exited the processing pipeline, thereby identifying a last-written SUID having been written into the writable congestion-indicating field, the last-written SUID being indicative of a most-downstream processing node of the plurality of processing nodes causing congestion in the processing pipeline; and recording the last-written SUID to the congestion statistics; identifying, by the supervisory computer, a most common last-written SUID recorded to the congestion statistics; identifying the specific node correlated with the most common last-written SUID; and causing at least one parameter associated with the specific node to be changed.

In some implementations, the determining the presence of the respective input queue is executed after the processing of the task body by the given processing node.

In some implementations, the plurality of processing nodes includes at least one of: a plurality of software-implemented nodes, a plurality of hardware-implemented nodes, and a plurality of storage devices.

According to another aspect of the present technology, there is provided a computer system including a task source for generating a stream of computer-implemented tasks to be processed by the computer system; and a plurality of processing nodes arranged in a sequence, the plurality of processing nodes forming a processing pipeline for processing the stream of computer-implemented tasks, each one of the plurality of processing nodes having a respective system-unique identifier (SUID), each given processing node of the plurality of processing nodes being configured to perform receiving a task packet from a sequentially previous processing node of the processing pipeline, the task packet having a task body indicative of a respective computer-implemented task, and a writable congestion-indicating field; processing the task body of the task packet; determining a presence of a respective input queue at the given processing node, the input queue comprising more than one task packet; and in response to the determining the presence of the respective input queue at the given processing node, updating the writable congestion-indicating field with the respective SUID of the given processing node.

In some implementations, the computer system further includes a supervisory computer communicatively connected to at least a last one of the plurality of processing nodes, the supervisory computer being configured for reading the writable congestion-indicating field of the task packet having exited the processing pipeline; identifying a last-written SUID having been written into the writable congestion-indicating field, the last-written SUID being indicative of a most-downstream processing node of the plurality of processing nodes causing congestion in the processing pipeline; identifying the specific node correlating to the last-written SUID.

In some implementations, the computer system is further configured to cause at least one parameter associated with the specific node correlating to the last-written SUID to be changed.

In some implementations, the computer system is a distributed computer-processing system.

According to yet another aspect of the present technology, there is provided a method of detecting congestion in a computer system, the computer system having a plurality of processing nodes arranged in a sequence and forming a processing pipeline for processing a stream of computer-implemented tasks generated by a task source, each one of the plurality of processing nodes having a respective system-unique identifier (SUID), the method being executable at the computer system. The method includes collecting congestion statistics of the plurality of processing nodes over a pre-determined period of time, the collecting being executed by repeating, over the pre-determined period of time, the steps of: receiving, by a given processing node of the plurality of processing nodes, a task packet, the given processing node being a sequential processing node after a previous processing node of the processing pipeline, the task packet having: a task body indicative of a respective computer-implemented task, and a writable congestion-indicating field; processing, by the given processing node, the task body of the task packet; determining, by the given processing node, a presence of a respective input queue at the given processing node, the input queue comprising more than one task packet; in response to the determining the presence of the respective input queue at the given processing node, updating, by the given processing node, the writable congestion-indicating field with the respective SUID of the given processing node; receiving, by a next processing node of the plurality of processing nodes, the task packet, the next processing node being a sequential processing node after the given processing node of the processing pipeline; processing, by the next processing node, the task body of the task packet; determining, by the next processing node, a presence of a respective input queue at the next processing node; and in response to the determining the presence of the respective input queue at the next processing node, updating, by the next processing node, the writable congestion-indicating field with the respective SUID of the next processing node; reading, by the computer system, the writable congestion-indicating field of the task packet having exited the processing pipeline, thereby identifying a last-written SUID having been written into the writable congestion-indicating field, the last-written SUID being indicative of a most-downstream processing node of the plurality of processing nodes causing congestion in the processing pipeline; and recording the last-written SUID to the congestion statistics; identifying, by the computer system, a most common last-written SUID recorded to the congestion statistics; identifying the specific node associated with the most common last-written SUID; and causing at least one parameter associated with the specific node to be changed.

In some implementations, the determining the presence of the respective input queue is executed after the processing of the task body by the given processing node.

In some implementations, the plurality of processing nodes comprises at least one of: a plurality of software-implemented nodes, a plurality of hardware-implemented nodes, and a plurality of storage devices.

In some implementations, the identifying the most common last-written SUID recorded to the congestion statistics comprises identifying a most frequently recorded last-written SUID over the pre-determined period of time.

In the context of the present specification, unless expressly provided otherwise, an "electronic device", a "user device", a "server", "computer-implemented element", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "storage" are intended to include media of any nature and kind whatsoever, non-limiting examples of which include Random-access Memory (RAM), Read-Only Memory (ROM), disks (Compact Disk ROMs (CD-ROMs), Digital Video Disks (DvDs), floppy disks, hard disk drives, etc.), Universal Serial Bus (USB) keys, flash memory cards, solid state-drives, and tape drives.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION OF NON-LIMITING EMBODIMENTS

The present detailed description is intended to be only a description of illustrative examples of the present technology. This description is not intended to define the scope nor set forth the bounds of the present technology. In some cases, helpful examples of modifications may be set forth as an aid to understanding the present technology, and not to define the scope or set forth the bounds of the present technology. These modifications are not an exhaustive list and other modifications are likely possible.

Further, where this has not been done (i.e. where no examples of modifications have been set forth), it should not be interpreted that no modifications are possible and/or that what is described is the sole manner of implementing that particular aspect of the present technology. In addition it is to be understood that the present detailed description provides in certain instances simple implementations of the present technology, and that where such is the case they have been presented in this manner as an aid to understanding. Various implementations of the present technology may be of a greater complexity.

Figure 1:
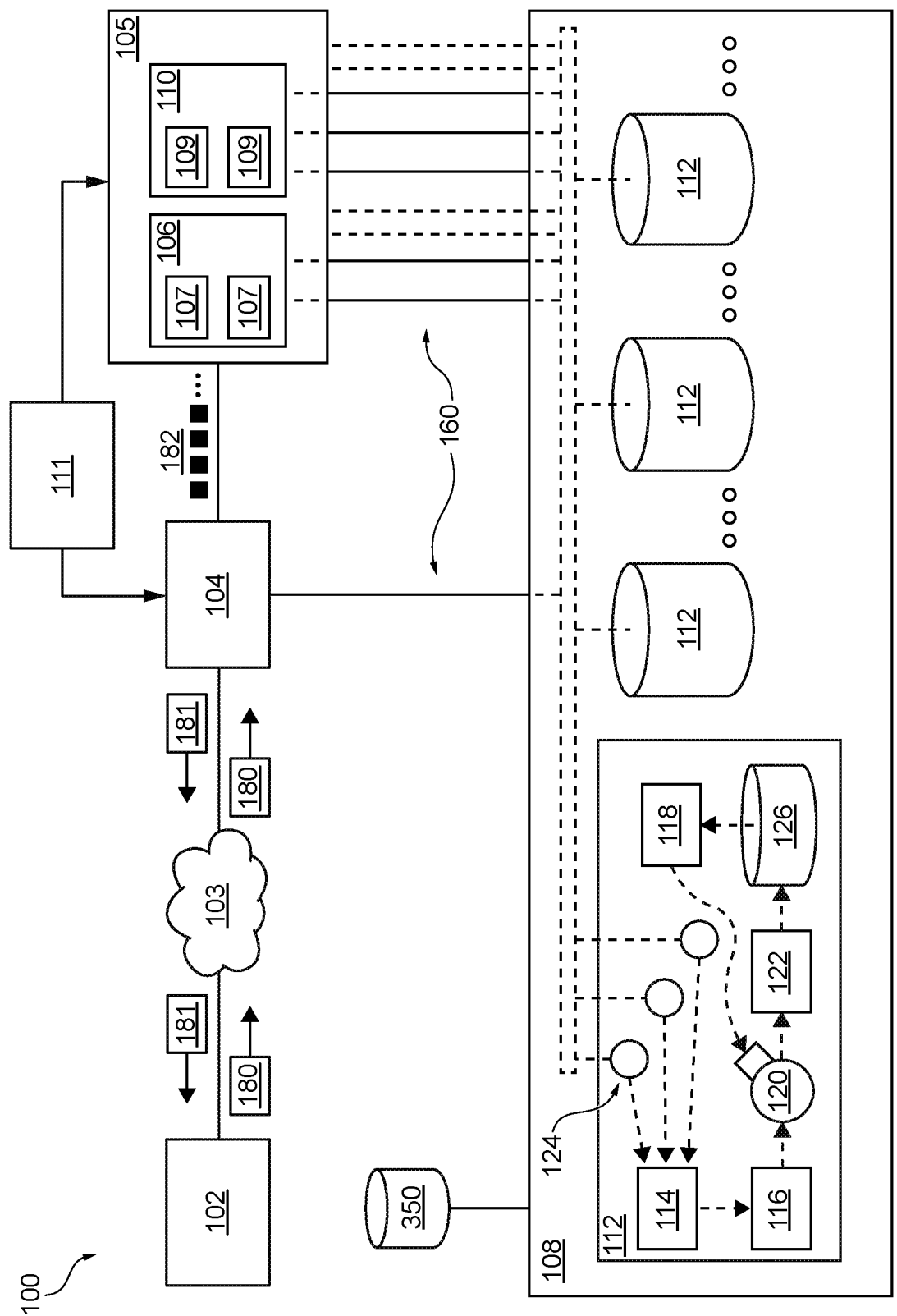
FIG. 1 depicts a system suitable for implementing non-limiting embodiments of the present technology.

Referring to FIG. 1, there is depicted a distributed computer-processing system 100 or a "distributed processing system" 100, for short. The distributed processing system 100 is configured for implementing non-limiting embodiments of the present technology. It is to be expressly understood that the distributed processing system 100 as depicted is merely an illustrative implementation of the present technology. Thus, the description thereof that follows is intended to be only a description of illustrative examples of the present technology. This description is not intended to define the scope or set forth the bounds of the present technology.

In some cases, what are believed to be helpful examples of modifications to the distributed processing system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the distributed processing system 100 may provide in certain instances simple implementations of the present technology, and that where such is the case they have been presented in this manner as an aid to understanding. As persons skilled in the art would understand, various implementations of the present technology may be of a greater complexity.

The distributed processing system 100 comprises a request source 102, a communication network 103, a request pre-processing sub-system 104, a transaction processing sub-system 105, a transaction routing sub-system 106, a distributed storage sub-system 108, a database sub-system 110, and an operational sub-system 111.

How the above listed components of the distributed processing system 100 are implemented in accordance to the various non-limiting embodiments of the present technology will now be described.

Request Source

The request source 102 may be an electronic device associated with an end user (e.g., a client device) or, alternatively, any other sub-system of the distributed processing system 100 that is configured to provide user requests for the distributed processing system 100. It should be expressly understood that even though FIG. 1 depicts only a single instance of the request source 102, the distributed processing system 100 may have multiple instances of the request source 102. As illustrated herein, the request source 102 is part of the distributed processing system 100, however, in some embodiments of the present technology, the request source 102 may be external to the distributed processing system 100, and connected via a communication link (not numbered).

In fact, a typical implementation of the distributed processing system 100 can include a large number of request sources 102, such as hundred instances, thousand instances, million instances, and the like.

In some embodiments of the present technology, where the distributed processing system 100 is employed in a business-to-customer (B2C) environment, the request source 102 may be a given client device, such as a smartphone, for example, associated with a given user of the distributed processing system 100. For example, the distributed processing system 100 may potentially provide cloud storage services for the given client device of the given user.

In other embodiments of the present technology, where the distributed processing system 100 is employed in a business-to-business (B2B) environment, the request source 102 may be a given sub-system, such as a remote server, for example, providing user requests to the distributed processing system 100. For example, in some embodiments of the present technology, the distributed processing system 100 may provide fault-tolerant data processing and/or storage services for an operator of the given sub-system.

Broadly speaking, irrespective of whether the distributed processing system 100 is implemented as a B2C or a B2B system (or any other variation of the system for that matter), the request source 102 may be a given client device or another sub-system which can be internal or external to the distributed processing system 100.

As mentioned above, the request source 102 is configured to issue a plurality of requests 180, each of which will be referred herein below as the request 180. The nature of the request 180 will depend on a type of the request source 102. However, one example of the request 180 is a query expressed in Structured Query Language (SQL). Therefore, it is contemplated that in some embodiments of the present technology, the request 180 may be expressed in a declarative programming language, which means that the request 180 may be a declarative-type request.

Generally speaking, declarative programming is a style of building a structure and elements of computer programs that expresses the logic of a computation without describing a control flow thereof. Common declarative programming languages include, but are not limited to, SQL, XQuery and other database query languages. Broadly speaking, a declarative-type request is one that specifies an action in terms of "what" needs to be executed, as opposed to how "how" it needs to be executed.

This means that a given declarative-type request may be associated with a given condition under which a given action should be executed. The given condition may be, for example, a condition on which entity the given action is to be executed or where to obtain values for the given action to be executed.

As non-limiting examples, the given declarative-type request can be formulated such as: "Upsert a value of 5 in a cell associated with a key that is equal to a value of a cell associated with a key A" and "For all keys associated with a cell having a value of 5, replace that value with a value 10". However, it should be understood that examples of declarative languages and examples of declarative-type requests have been provided above for ease of illustration only, and that other declarative languages and other declarative-type requests may be used by the request source 102, without departing from the scope of the present technology.

In some embodiments of the present technology, the request source 102 is also configured to receive a plurality of responses 181, each of which will be referred herein below as the response 181. Generally speaking, in response to the request 180 being processed (or potentially not processed) by the distributed processing system 100, the distributed processing system 100 may generate the response 181 destined to the request source 102 associated with the respective request 180. The nature of the response 181 will depend on inter alia a type of the request source 102, the type of the respective request 180 and whether the distributed processing system 100 processed (or potentially not processed) the respective request 180. In some embodiments of the present technology, the distributed processing system 100 may generate the response 181 only in case of a failure to process the request, only in case of a successful processing of the request, or both.

In one example, during processing of the request 180, the distributed processing system 100 may be configured to request additional data from the request source 102 for continuing or completing processing of the request 180. In such a case, the distributed processing system 100 may be configured to generate the response 181 in a form of a data-request message being indicative of additional data requested by the distributed processing system 100 for continuing or completing the processing of the request 180.

In another example, if the distributed processing system 100 successfully processed the respective request 180, the distributed processing system 100 may be configured to generate the response 181 in a form of a success message being indicative of successful processing of the respective request 180.

In a further example, if the distributed processing system 100 failed to successfully process the respective request 180, the distributed processing system 100 may be configured to generate the response 181 in a form of a failure message being indicative of failed processing of the respective request 180. In such a case, the request source 102 may be configured to perform additional actions such as, but not limited to, re-issuing the request 180, performing diagnostic analyzes for identifying the reason of failed processing of the request 180 by the distributed processing system 100, issuing a new request destined to the distributed processing system 100, and the like.

Communication Network

The request source 102 is communicatively coupled to the communication network 103 for providing the request 180 to the distributed processing system 100 and for receiving the response 181 from the distributed processing system 100. In some non-limiting embodiments of the present technology, the communication network 103 can be implemented as the Internet. In other non-limiting embodiments of the present technology, the communication network 103 can be implemented differently, such as any wide-area communication network, local-area communication network, a private communication network and the like. How a communication link (not separately numbered) between the request source 102 and the communication network 103 is implemented will depend on inter alia how the request source 102 is implemented.

Merely as an example and not as a limitation, in those embodiments of the present technology where the request source 102 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the request source 102 is implemented as a remote server, the communication link can be either wireless (such as Wireless Fidelity, or WiFi® for short, Bluetooth® or the like) or wired (such as an Ethernet based connection).

It should be noted that the communication network 103 is configured to transmit inter alia a request data-packet comprising the request 180 from the request source 102 to the request pre-processing sub-system 104 of the distributed processing system 100. For example, this request data-packet may comprise computer-executable instructions written in a given declarative-type programming language which represent the request 180. The communication network 103 is also configured to transmit inter alia a response data-packet comprising the response 181 from the distributed processing system 100 to the request source 102. For example, this response data-packet may comprise computer-executable instructions representing the response 181.

However, it is contemplated that, in some embodiments of the present technology, where the request source 102 is a given sub-system of the distributed processing system 100, for example, the communication network 103 may be implemented in a different manner from what is described above or, in some cases, may even be omitted, without departing from the scope of the present technology.

Operational sub-system (Hive)

As mentioned above, the distributed processing system 100 comprises the operational sub-system 111, or simply "the hive", for short. Generally speaking, the hive 111 is a given software-based application (for example, a state machine) that is configured to manage at least some sub-systems of the distributed processing system 100, such as the request pre-processing sub-system 104, and the transaction processing sub-system 105, for example. It can be said that the hive 111 may be embodied as a given State Machine (SM) that is configured to generate, delete and/or balance load of other SMs forming the at least some sub-systems of the distributed processing system 100.

It should be understood that a given SM is a computational model employed by computer systems and which is defined by a list of "states". The given SM may change its current state in response to some external input and may be in exactly one state at any given moment in time. A change from a given state to another state of the given SM is called a "state transition".

It should be noted that, in the context of the present technology, the SMs forming the at least some sub-systems of the distributed processing system 100 are deterministic in nature, that is, each state transition of each such SM is uniquely determined by (i) a current state of a respective SM and (ii) a given external input provided to the respective SM. In other words, for a given current state of the respective SM and for a given external input, there is a unique next state of the respective SM. This deterministic nature of the state transition is true irrespective of which SM of the distributed processing system 100 is undergoing the state transition.

Therefore, as it will be described further below, in some embodiments of the present technology, the distributed processing system 100 may need to receive external inputs of a particular type that satisfy this deterministic property of the SMs of the at least some sub-systems of the distributed processing system 100.

Distributed Storage Sub-System

As mentioned above, the distributed processing system 100 also comprises the distributed storage sub-system 108. Generally speaking, the distributed storage sub-system 108 is configured to inter alia store "system data" indicative of states, state transitions, external inputs and/or outputs of at least some of the SMs of the distributed processing system 100. For example, the system data associated with a given SM of the distributed processing system 100 may be stored in a form of a log, and where the log is indicative of a historical listing of states, state transitions, external inputs and/or outputs of the given SM.

The distributed storage sub-system 108 is also configured to store "client data"—i.e. data associated with the processed external inputs by the distributed processing system 100. For example, in some embodiments of the present technology, client data may be stored as part of the system data in the distributed storage sub-system 108 without departing from the scope of the present technology.

In order to store the system data and/or the client data, the distributed storage sub-system 108 comprises a plurality of storage devices 112, each of which will be referred herein below as the storage device 112. In accordance with the various embodiments of the present technology, some or all of the plurality of storage devices 112 can be located in a single location or distributed amongst different locations. For example, some or all of the plurality of storage devices 112 can be located in a single server rack and/or a single data center and/or distributed over a plurality of server racks in one or more data centers.

In some embodiments of the present technology, the system data and/or the client data stored by a given storage device 112 may be replicated and stored on more than one other storage devices 112. In these embodiments, such replication and storing of the system data and/or the client data may result in a fault-tolerant storage of the system data and/or the client data by the distributed processing system 100. Fault-tolerant storage of the system data and/or the client data may allow preventing data loss in cases where a given storage device 112 of the distributed storage sub-system 108 becomes, temporarily or permanently, unavailable for storage and data retrieval purposes. Also, this fault-tolerant storage of the system data and/or the client data may allow preventing data loss in cases where a given SM of the distributed processing system 100 becomes, temporarily or permanently, unavailable.

It is contemplated that the storage device 112 may be implemented as a computer server. The computer server comprises at least one physical memory device (i.e. a memory drive 126) and hosts one or more software applications configured to execute computer-readable instructions. The memory drive 126 can be executed as solid state drive (SSD), hard disk drive (HDD), or the like. Therefore, it can be said that the at least one physical memory device can be implemented as either a movable disk type device or a immovable (static) disk type device.

For example, as depicted in FIG. 1, a given storage device 112 may be configured to host software applications, such as, but not limited to: (i) a virtual-drive (Vdrive) application 114, a physical-drive (Pdrive) application 115, at least one drive model application 118, at least one operation scheduling application 120, a real-time operation enforcing application 122, and at least one SM proxy 124. Functionalities of the above listed software applications and of the memory drive 126 for storing at least some system data and/or the client data will be described in greater detail further below with reference to FIG. 2.

Request Pre-Processing Sub-System

As previously alluded to, the transaction processing sub-system 105 may be formed by a number of deterministic SMs that require receiving external inputs of a particular type and which satisfy the deterministic property of the deterministic SMs. It should also be recalled that the request source 102 issues the request 180 in a form of a declarative-type request.

As such, the request pre-processing sub-system 104 is configured to receive the request 180, which is the declarative-type request originated from the request source 102, and to pre-process/translate the request 180 into a plurality of deterministic transactions 182 that satisfy the deterministic property of the number of deterministic SMs forming the transaction processing sub-system 105.

Therefore, broadly speaking, the purpose of the request pre-processing sub-system 104 is to ensure that the transaction processing sub-system 105 is able to process the request 180 by pre-processing/translating the request 180 into a plurality of transactions that are processable by the deterministic SMs of the transaction processing sub-system 105.

It should be noted that the request pre-processing sub-system 104 is also configured to generate the response 181 to be transmitted to the request source 102. Indeed, the request pre-processing sub-system 104 is communicatively coupled to the transaction processing sub-system 105, not only to transmit thereto the plurality of deterministic transactions 182, but also to receive therefrom information regarding processing of the plurality of deterministic transaction 182. In some of the non-limiting embodiments of the present technology, the plurality of deterministic transactions 182 can be of one or more of any of a "write" type and a "read" type.

In some embodiments of the present technology, the request pre-processing sub-system 104 is implemented as at least one SM, without departing from the scope of the present technology.

In some embodiments of the present technology, it is contemplated that the distributed computer-processing system 100 of FIG. 1 may support "ACID" transactions. Broadly speaking, "ACID" (atomicity, consistency, isolation and durability) is an acronym for a set of transaction properties which are directed to maintain database reliability when transactions are executed. Therefore, in some embodiments of the present technology, it is contemplated that transactions destined to the transaction processing subsystem 105 may be atomical, consistent, isolated and durable, without departing from the scope of the present technology.

Transaction Processing Sub-System

Generally speaking, the transaction processing sub-system 105 is configured to receive and process the plurality of deterministic transactions 182, thereby processing the request 180 of the request source 102. The transaction processing sub-system 105 includes (i) the transaction routing sub-system 106 and (ii) the database sub-system 110, which will now be described in turn.

The database sub-system 110 includes a plurality of transaction destination locations (TDLs) and is partitioned into a plurality of shards 109, each of which will be referred herein below as the shard 109. In one non-limiting example, the database sub-system 110 may host a database having a given database table (or more than one). The given database table may be composed of at least two columns, such as a first column having keys and a second column having records that store data in association with the respective keys. In this non-limiting example, a given TDL may correspond to a given row of the given database table, that is, the given TDL may correspond to a given key and a respective record in the given database table.

As such, in this non-limiting example, each shard 109 of the database sub-system 110 hosts a portion of the given database table. Hence, the given plurality of TDLs, corresponding to the respective rows of the given database table, is split between the plurality of shards 109 such that each shard 109 comprises a respective subset (e.g. range) of the given plurality of TDLs.

In some embodiments of the present technology, it is contemplated that each one of the plurality of shards 109 may be implemented by a respective deterministic SM. This means that, upon receiving a given transaction destined to a TDL of a given shard 109 implemented by a given SM, the given SM may process the transaction and thereby transition to a new state thereof from a current state thereof based on the given transaction, as explained above.

The transaction routing sub-system 106 is configured to route transactions from the plurality of deterministic transaction 182 to respective TDLs and, therefore, to the respective shards 109 of the database sub-system 110. To that end, the transaction routing sub-system 106 may be formed by a plurality of ports that are generally configured to (i) receive the plurality of deterministic transactions 182 from the request pre-processing sub-system 104, (ii) order the plurality of deterministic transactions 182 into subsets of deterministic transactions destined to respective shards 109, and (iii) generate centralized per-shard orders for execution by the respective shards 109 of the deterministic transactions in each one of the centralized per-shard orders of execution.

It should be noted that each one of the plurality of ports forming the transaction routing sub-system 106 may be implemented as a respective SM. In some embodiments, it is contemplated that the plurality of ports may comprise two different types of ports for routing transactions from the plurality of deterministic transactions 182 to the respective shards 109. In other embodiments, at least some functionalities of the plurality of ports may be executed by the SMs corresponding to the plurality of shards 109.

Also, as depicted in FIG. 1, at least some of the SMs of the transaction processing sub-system 105 may be communicatively coupled to the distributed storage sub-system 108 by a respective communication link 160. Broadly speaking, the purpose of a given communication link 160 is to convey system data indicative of inter alia states, state transitions, external inputs and/or outputs of respective SMs to the distributed storage sub-system 108 for storage thereof. How the communication links 160 are established and how the distributed storage sub-system 108 is configured to store the system data will now be described in greater detail with reference to FIG. 2.

Figure 2:
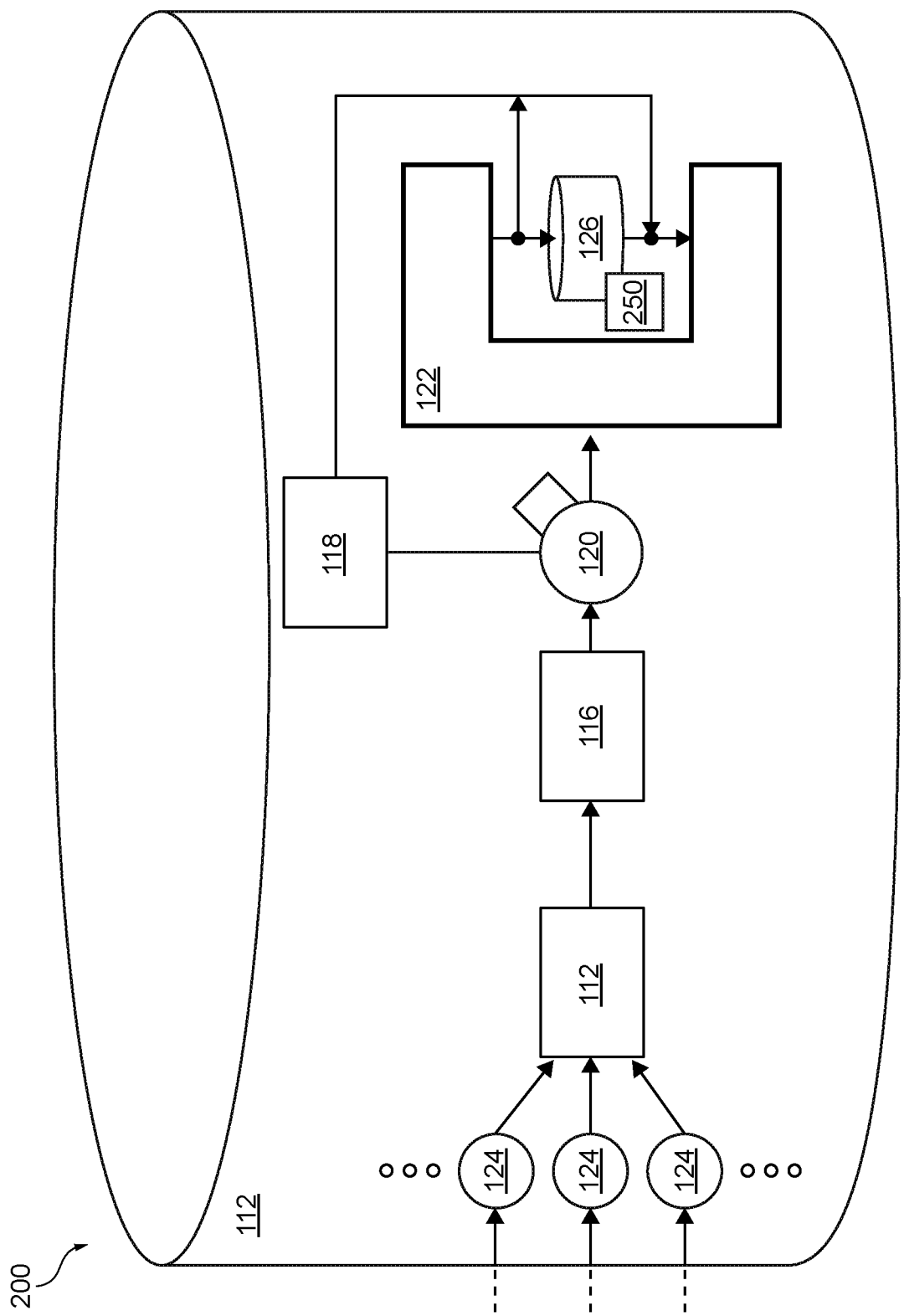
FIG. 2 depicts a storage device of a distributed storage sub-system of the system of FIG. 1 in accordance with some embodiments of the present technology.

In FIG. 2, there is depicted the storage device 112 which is part of the distributed storage sub-system 108. As previously mentioned, the storage device 112 comprises the at least one SM proxy 124. The purpose of a given SM proxy is to manage communication between a given SM and the distributed storage sub-system 108. In some embodiments of the present technology, it is contemplated that the at least one SM proxy 124 of the storage device 112 may be an Application Programing Interface (API) managing communication between a given SM and the storage device 112. In other embodiments of the present technology, the at least one SM proxy 124 itself can be implemented as a SM. In other embodiments of the present technology, the at least one SM proxy 124 can be implemented as a software module (not in itself a SM) for executing functions described immediately above.

In some embodiments of the present technology, a given SM proxy 124 may be configured to (i) receive system data indicative of a log update of a given SM via a respective communication link 160, (ii) process the system data, and (iii) transmit the processed system data to a respective Vdrive application 114 for further processing.

The at least one SM proxy 124 may be configured to process the system data, for example, for ensuring consistency and fault-tolerance of the system data. It is contemplated that the at least one SM proxy 124 may be configured to perform erasure-coding of system data, in some embodiments of the present technology. Broadly speaking, erasure-coding is an encoding method in which data is provided with redundancy and is then split into several fragments. Such redundancy provision and fragmentation may facilitate restoration of data if one ore more fragments are lost due to faults in a given system.

It is contemplated that the so-processed system data by the at least one SM proxy 124 is received by the at least one respective Vdrive application 114 of the storage device 112. The purpose of a given Vdrive application 114 is to process the system data received from the at least one SM proxy 124 and, in response, generate corresponding Input-Output (I/O) operations that are to be executed by the memory drive 126 for storing the system data on the memory drive 126 of the storage device 112. Once the at least one Vdrive application 114 generates the I/O operations corresponding to the system data received thereby, the at least one Vdrive application 114 then transmits the I/O operations to the Pdrive application 116.

As such, it is contemplated that a given storage device 112 may have more than one SM proxies 124 for processing and transmitting system data to more than one respective Vdrive application 114, which in turn process the system data, generate respective I/O operations, and transmit the respective I/O operations to a single Pdrive application 116 of the storage device 112.

Broadly speaking, the purpose of the Pdrive application 116 is to control operation of the memory drive 126. For example, the Pdrive application 116 may be configured to perform encoding of I/O operations to be executed on the memory drive 126 and various other functionalities that facilitate reliable storage of data on the memory drive 126.

The Pdrive application 116 is commutatively coupled to the operation scheduling application 120 to transmit thereto the I/O operations. The operation scheduling application 120 is configured for scheduling the transmission of the I/O operations to the memory drive 126. It is contemplated that the operation scheduling application 120, or simply "scheduler" for short, may execute various scheduling schemes for determining an order in which the I/O operations are to be transmitted to the memory drive 126 for further execution.

It is contemplated that, in some embodiments of the present technology, the operation scheduling application 120 may be implemented as part of the Pdrive application 116. In other words, execution of various scheduling schemes may be performed by the Pdrive application 116, without departing from the scope of the present technology.

In one case, the operation scheduling application 120 may provide a scheduling scheme of a "fair" type. It should be understood that a given storage device 112 may require to store I/O operations corresponding to system data associated with more than one SMs. Also, each one of the more than one SMs is associated with a pre-determined proportion of drive bandwidth that the memory drive 126 may allocate for executing the I/O operations associated with that respective SM. Therefore, broadly speaking, fair-type scheduling schemes are configured to order the I/O operations to be transmitted to the memory drive 126 such that the drive bandwidth of the memory drive 126 for executing the ordered I/O operations is used in accordance with the pre-determined proportions associated with the more than one SMs.

In another case, the operation scheduling application 120 may provide a scheduling scheme of a "real-time" type. It should be recalled that the distributed processing system 100 may be employed for providing cloud storage services. In many such implementations, it may be desirable to process system data and store it according to real-time requirements or, in other words, within a very short interval of time. As such, in order to support real-time requirements of the distributed processing system 100, the I/O operations may be associated with respective deadlines that are indicative of a moment in time after which the execution of the respective I/O operations is no longer performed within an acceptable amount of time for supporting real-time requirements of the distributed processing system 100. Therefore, broadly speaking, real-time scheduling schemes are configured to order the I/O operations to be transmitted to the memory drive 126 such that the I/O operations are to be executed by the memory drive 126 within respectively associated deadlines.

In a further case, the operation scheduling application 120 may provide a hybrid scheduling scheme. In other words, the operation scheduling application 120 may provide a scheduling scheme that is able to order the I/O operations for transmission of the memory drive 126 for execution such that the pre-determined proportions of drive bandwidth for each respective SM is respected and that respective deadlines of the I/O operations are also respected.

As previously mentioned, the memory drive 126 is a storage medium for executing I/O operations and thereby storing system data transmitted to the storage device 112. For example, the memory drive 126 may be implemented as an HDD or an SSD. The memory drive 126 includes a drive-internal logic 250 for selecting a given I/O operation for current execution amongst all I/O operations transmitted thereto.

It should be noted that I/O operations may potentially be sent one-by-one for execution to the memory drive 126, but this would result in an increased latency between the memory drive 126 and other components of the storage device 112. Therefore, the I/O operations may also be transmitted in batches or groups of I/O operations to the memory drive 126. Once a batch or group of I/O operations is received by the memory drive 126, the drive-internal logic 250 is configured to select amongst the I/O operations available thereto (from the batch) a most efficient I/O operation for execution.

For example, the most efficient I/O operation may be selected based on a variety of criteria such as, for example, a location where a previous I/O operation has been executed on the memory drive 126 and locations of the I/O operations available to the memory drive 126 where they are ought to be executed on the memory drive 126. In other words, the drive-internal logic 250 is configured to select, for current execution, a most efficient one (from the perspective of the memory drive 126) amongst all the I/O operations available to the memory drive 126 at a given moment in time.

For that reason, in some cases, although the operation scheduling application 120 may have ordered I/O operations in a specific order of transmission for respecting the real-time requirements of the distributed processing system 100, the drive-internal logic 250 of the memory drive 126 may instruct the memory drive 126 to organize them in an execution order that is different from the transmission order selected by the operation scheduling application 120. Therefore, it may happen that the execution order may no longer respect the real-time requirements of the distributed processing system 100 (especially as additional I/O operations are received from the operation scheduling application 120, which additional I/O operations may be more "efficient" from the perspective of the memory drive 126 and that may be picked over non-yet-executed I/O operations).

In order to ensure real-time operation of the storage device 112 and to avoid the above-described problem (which is also known as "operation stagnation"), the storage device 112 may include the real-time operation enforcing application 122. Broadly speaking, the real-time operation enforcing application 122 allows controlling which I/O operations amongst those that have been already ordered by the operation scheduling application 120 are transmitted at any given time to the memory drive 126 for execution.

It is contemplated that, in some embodiments of the present technology, the real-time operation enforcing application 122 may be implemented as part of the Pdrive application 116. In other words, the above-mentioned functionalities of the real-time operation enforcing application 122 may be performed by the Pdrive application 116, without departing from the scope of the present technology.

The storage device 112 is also configured to host at least one respective drive model application 118 for each memory drive 126 of the storage device 112. Broadly speaking, the drive model application 118 is configured to emulate ideal operation of the memory drive 126 for diagnostic analyses of the memory drive 126. In other embodiments, however, the operation scheduling application 120 may also be configured to employ the drive model application 118 for ordering the I/O operations for transmission to the memory drive 126.

It is contemplated that, in some embodiments of the present technology, the at least one respective drive model application 118 may be implemented as part of the Pdrive application 116. In other words, the above-mentioned functionalities of the at least one respective drive model application 118 may be performed by the Pdrive application 116, without departing from the scope of the present technology.

Figure 3:
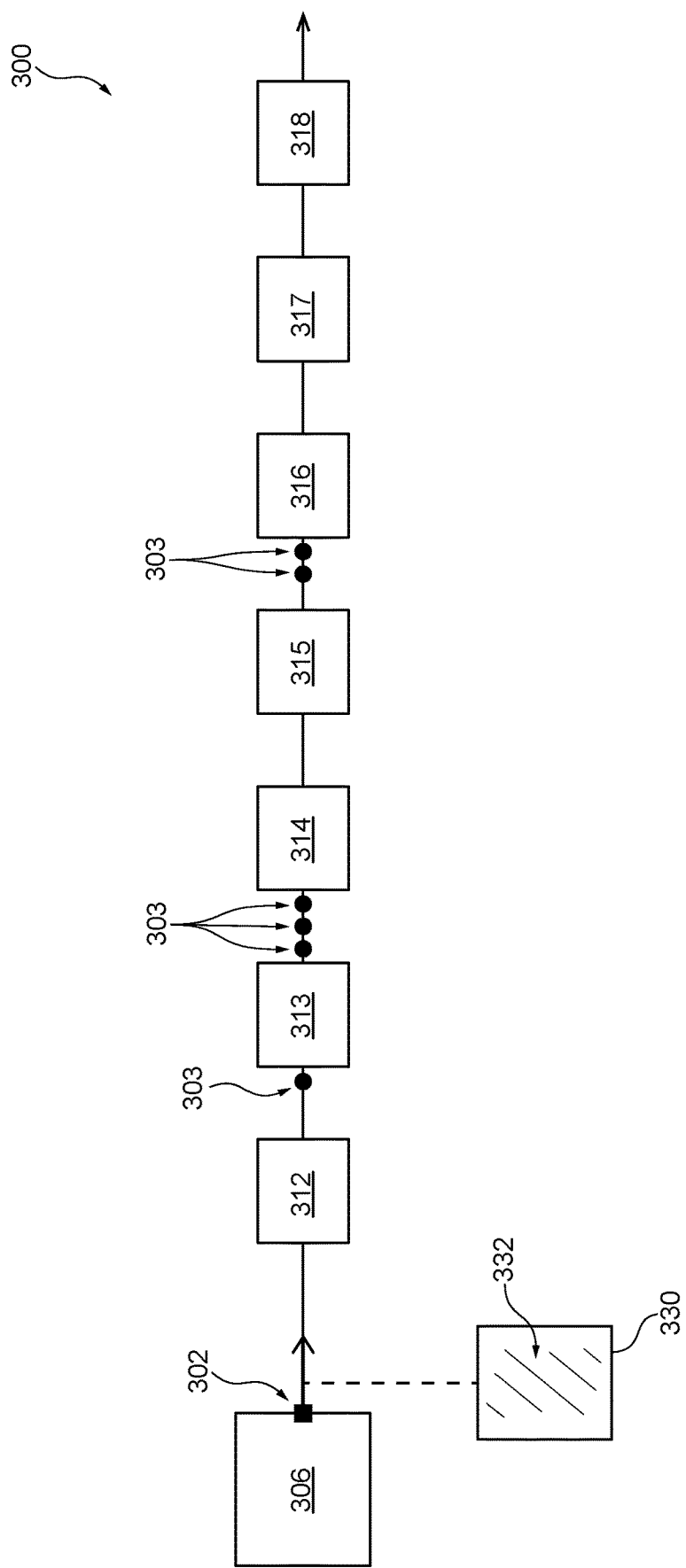
FIG. 3 is a schematic illustration of a processing pipeline utilized in the system of FIG. 1.

With reference to FIG. 3, a processing pipeline 300 of the distributed processing system 100 will be described according to the present technology. It should be noted that the pipeline 300 is schematically illustrated for simplicity of explanation, but variations are contemplated as will be described herein.

In general terms, the processing pipeline 300 is configured to process a stream of tasks via a series of processing nodes 312. Various implementations of the processing pipeline 300 are found in the distributed processing system 100 (or, for short "system 100"). As one non-limiting example, the SM proxy 124, processing the system data transmitted from a given SM and generating Input/Output (I/O) operations that are to be executed by the memory drive 126 for storing the system data, could be a processing pipeline 300 utilizing the methods described below.

As another non-limiting example, the processing pipeline 300 could be an implementation of the transaction routing sub-system 106, where the processing nodes 312 correspond to the plurality of ports for routing transactions from the plurality of deterministic transactions 182 to the respective shards 109. Therefore in such an implementation, the methods described herein for managing congestion in the processing pipeline 300 could be implemented to manage congestion of the transaction routing sub-system 106.

As another non-limiting example, the processing pipeline 300 could be an implementation of the overall distributed processing system 100 as illustrated in FIG. 1 and described above. Each processing node 312, in such a case, would represent one of the computer-implemented elements of the distributed processing system 100. Therefore in such an implementation, the methods described herein for managing congestion in the processing pipeline 300 could be implemented to manage congestion of data processing throughout the distributed processing system 100.

It is noted that while the processing pipeline 300 is described herein with reference to the distributed processing system 100, the present technology is not meant to be so limited. Further applications of the present technology will be discussed below.

The processing pipeline 300 includes a plurality of processing nodes 312-318, referred to herein generally as the processing node 312. Although the processing pipeline 300 is illustrated with seven processing nodes 312 in the Figures, the processing pipeline 300 could include more or fewer nodes 312 depending on the particular embodiment. Each processing node 312 has a system-unique identifier (SUID), which is simply an alpha-numeric identifier assigned to each processing node 312. The SUID is unique to each processing node 312 within the system 100, such that a particular node 312 can be identified, as will be described in more detail below.

The processing nodes 312 are referred to generically herein, as the present technology is applicable to a wide variety of implementations of processing nodes. The processing nodes 312 can be implemented as, for example but not limited to, software-implemented nodes, software-based applications, hardware-implemented nodes, a combination of hardware and software nodes, firmware based nodes, or a plurality of storage devices. It is further contemplated that the processing nodes 312 could be implemented as distributed state machines, such as a Replicated State Machine, a State Machine over Shared Logs, and the like. An example of one such implementation of the State Machine over Shared Logs or SMSL for short is disclosed in co-owned U.S. patent application Ser. No. 16/401,688, a content of which is hereby incorporated by reference in its entirety. In some non-limiting implementations, the processing pipeline 300 could include multiple variations of nodes 312 within a single processing pipeline 300.

As is represented by the linear alignment of the nodes 312 in the Figures, the processing nodes 312 are arranged in a sequence, forming the "pipeline" 300. It should be noted that the nodes 312 are communicatively arranged to process tasks sequentially, but the physical distribution of the nodes 312 does not need to be implemented as is depicted in the Figures and other variations are possible.

As the processing nodes 312-318 work sequentially, multiple tasks awaiting processing at any particular node 312 will slow the processing of tasks by the processing pipeline 300 overall. The present technology describes methods for identifying congestion in the processing pipeline 300, and specifically for determining a particular node 312 in the pipeline 300 that is causing a bottleneck. The present technology is further directed to methods of analyzing congestion information in the processing pipeline 300 in order to identify which ones of the processing nodes 312 require a remedial action, such as re-programming, repair, replacement or the like.

While the processing nodes 312 are illustrated as different modules (312-318), it is contemplated that the series of nodes 312 in a particular processing pipeline 300 could include more than one use of a particular node 312. For example, nodes 313 and 315 are the second and fourth nodes 312 respectively in the processing pipeline 300 illustrated in FIG. 3. But in some implementations, the nodes 313 and 315 could be the same hardware-implemented node 312, used in the second and fourth steps in the particular processing pipeline 300 implementation. It is also noted that a particular processing node 312 could appear in more than one processing pipeline 300 in the distributed processing system 100.

The distributed processing system 100 includes at least one task source 306 which generates a stream of computer-implemented tasks to be processed by the processing pipeline 300. Only one task source 306 will be discussed herein, but it contemplated that the system 100 could include more than one or many task sources 306. The task source 306 is communicatively connected to the processing pipeline 300, such that the processing pipeline 300 can receive the task stream from the task source 306 for processing, as will be described below. More specifically, the task source 306 is communicatively connected to at least the first node 312 of the processing pipeline 300.

The task source 306 is described generically herein, but it is contemplated that the task source 306 could be various elements of the distributed processing system 100. The task source 306 could be embodied by hardware of the system 100, software-based applications utilized in the system 100, or any combination thereof. It is also contemplated that in any one implementation of the distributed processing system 100, there could be multiple task sources 306 which could be any mix of hardware and software based task sources 306 which produce task to be processed by one or more processing pipelines 300. In some other non-limiting embodiments of the preset technology, the task source 306 can be implemented as a client device outside of the system 100.

In the non-limiting implementation of the processing pipeline 300 representing the SM proxy 124 described above, for example, the task source 306 would correspond to the given SM for which the SM proxy 124 is processing commands. Similarly, in the non-limiting implementation of the processing pipeline 300 representing the entire distributed processing system 100 described above, the task source 306 could correspond to the request source 102, the request pre-processing sub-system 104, and/or the transaction processing sub-system 105.

Computer-implemented tasks generated by the task source 306 can be of many forms including, but not limited to: I/O operations, log updates, and transactions. Depending on the specific implementation of the processing pipeline 300, it is contemplated that different types of computer-implemented tasks could be processed. It should be expressly understood that embodiments of the present technology can be applied to any type of tasks processed in the processing pipeline 300. It is also noted that the form of the task could change as it propagates through the processing pipeline 300. For example, a particular task may be transformed from a transaction to an I/O operation at some point in processing by the processing pipeline 300.

The distributed processing system 100 also includes a supervisory computer 350. Although illustrated in FIG. 1 as a separate computer-implemented element, it is contemplated that other elements of the distributed processing system 100 as described above could fulfill the operations of the supervisory computer 350. It is also contemplated that the supervisory computer 350 could be embodied by a software-based application, rather than a hardware-implemented computer.

The supervisory computer 350 is communicatively connected to the processing pipeline 300. The supervisory computer 350 is configured to receive information related to tasks, having been completed and exiting the processing pipeline 300. In some implementations, the supervisory computer 350 could receive information relating to the completed task from at least one of the processing nodes 312. It is also contemplated that the supervisory computer 350 could receive the information relating to the completed task from another element of the distributed processing system 100, although it is noted that the processing nodes 312 could include any component of the distributed processing system 100, depending on the specific implementation. It is further contemplated that the processing pipeline 300 could include additional computer-implemented elements, depending on the specific implementation.

With the various elements of the pipeline 300 having been set out above, an example operation of the pipeline 300 processing a particular computer-implemented task 302 according to the present technology will now be explored in further detail with additional reference to FIGS. 4 to 7. More specifically, determination and resolution of congestion in the processing pipeline 300 will be described, according to the present technology.

The task source 306 generates a series of computer-implemented tasks 302 and 303 to be communicated to and processed by the processing nodes 312. For purposes of description, tasks produced by the task source 306 before and after the particular computer-implemented task 302 are labeled and referred to as computer-implemented tasks 303 in order to differentiate from the computer-implemented task 302 being observed in the present explanation.

The tasks 303, illustrated in the Figures as dots for simplicity, are shown at a moment in time where some of the series of computer-implemented tasks 303 have progressed through the processing pipeline 300. The computer-implemented task 302 being observed passing through the processing pipeline 300 is represented by a square in the Figures.

Processing of the computer-implemented task 302 begins with creation of the computer-implemented task 302 by the task source 306. The task source 306 creates a task packet 330, which includes a task body 332 indicative of the computer-implemented task 302.

Figure 4:
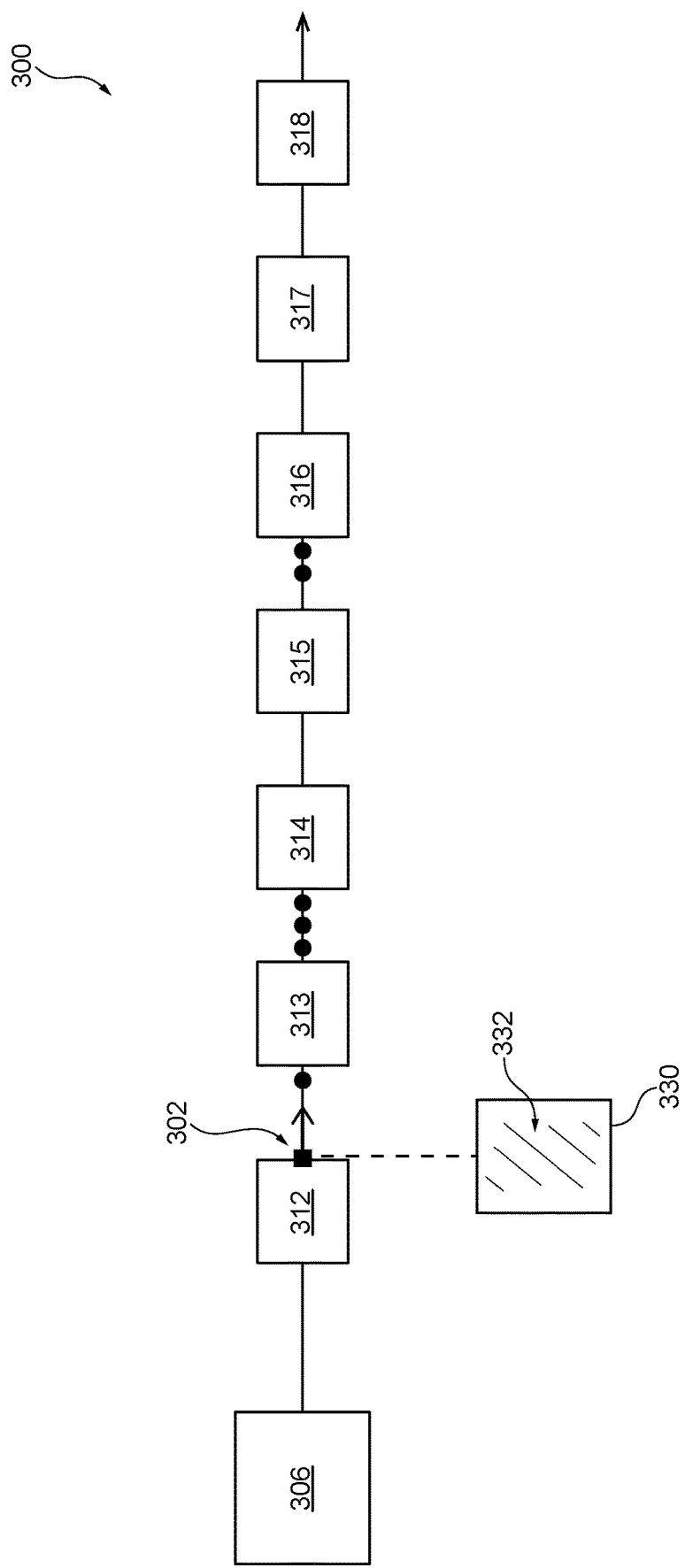
FIGS. 4 to 7 are schematic illustrations of a task being processed by the processing pipeline of FIG. 3, represented at different points in the processing.

The first processing node 312 receives the task packet 330 and processes it. As is illustrated in FIG. 4, there is no queue behind the task packet 330 and the task body 332 is processed and then sent on to the next processing node 313. The node 313 similarly processes the task body 332, and passes the task packet 330 to the sequentially next node 314.

Figure 5:
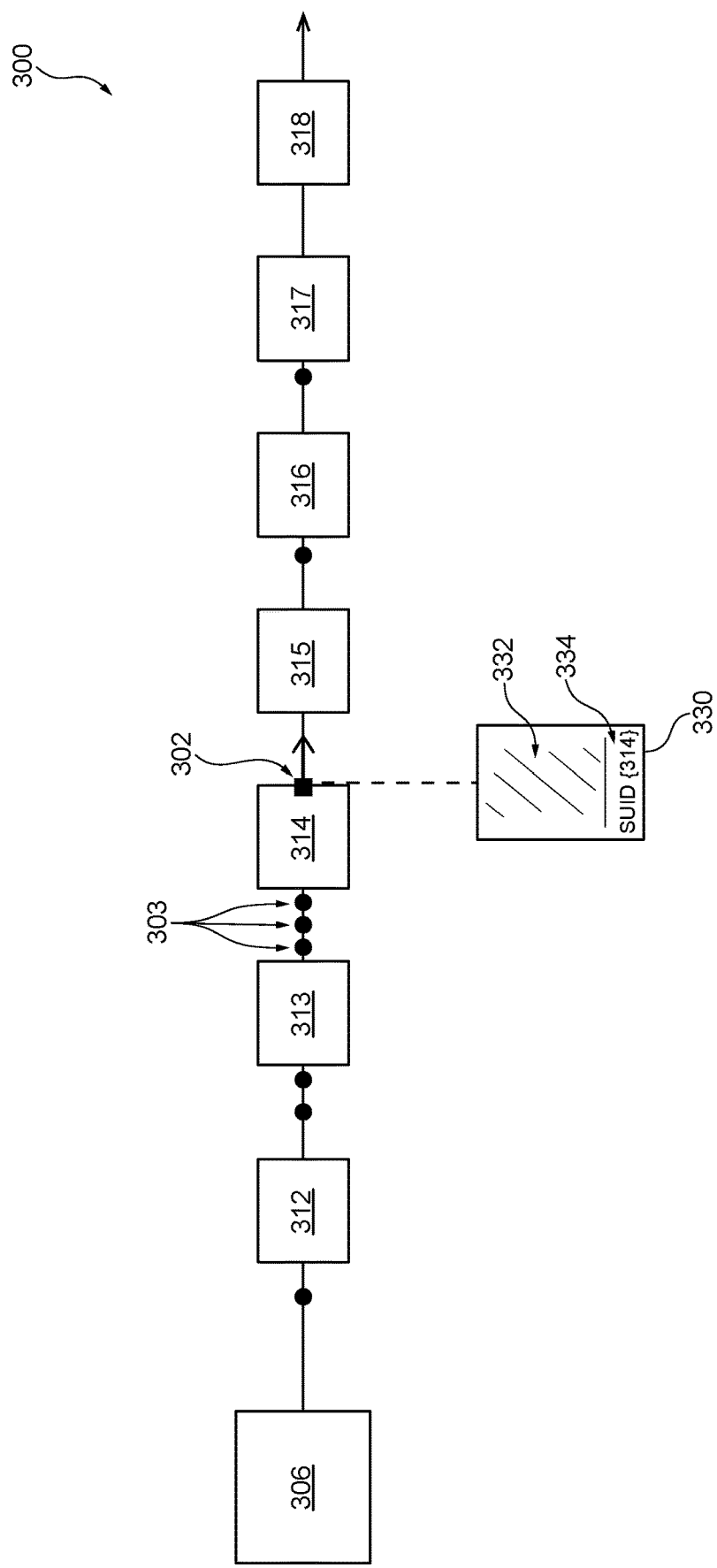

The node 314 then receives and processes the task packet 330. Once the task packet 330 has been processed, the processing node 314 then determines that there is a queue of computer-implemented tasks 303 waiting to be processed by the 314. As is illustrated in FIG. 5, the processing node 314 then adds an indication of the queue at the node 314 to the task packet 330. Specifically, processing node 314 appends the task body 332 with a writable congestion-indicating field 334 and inserts the SUID of the processing node 314 into the writable congestion-indicating field 334. The node 314 then passes the task packet 330, now including both the task body 332 and the writable congestion-indicating field 334, to the sequentially next node 315. As will be described further below, it is contemplated that the processing node 314 can determine that there is a queue of computer-implemented tasks 303 waiting to be processed by the 314 during, or before, processing the task body 332.

Figure 6:
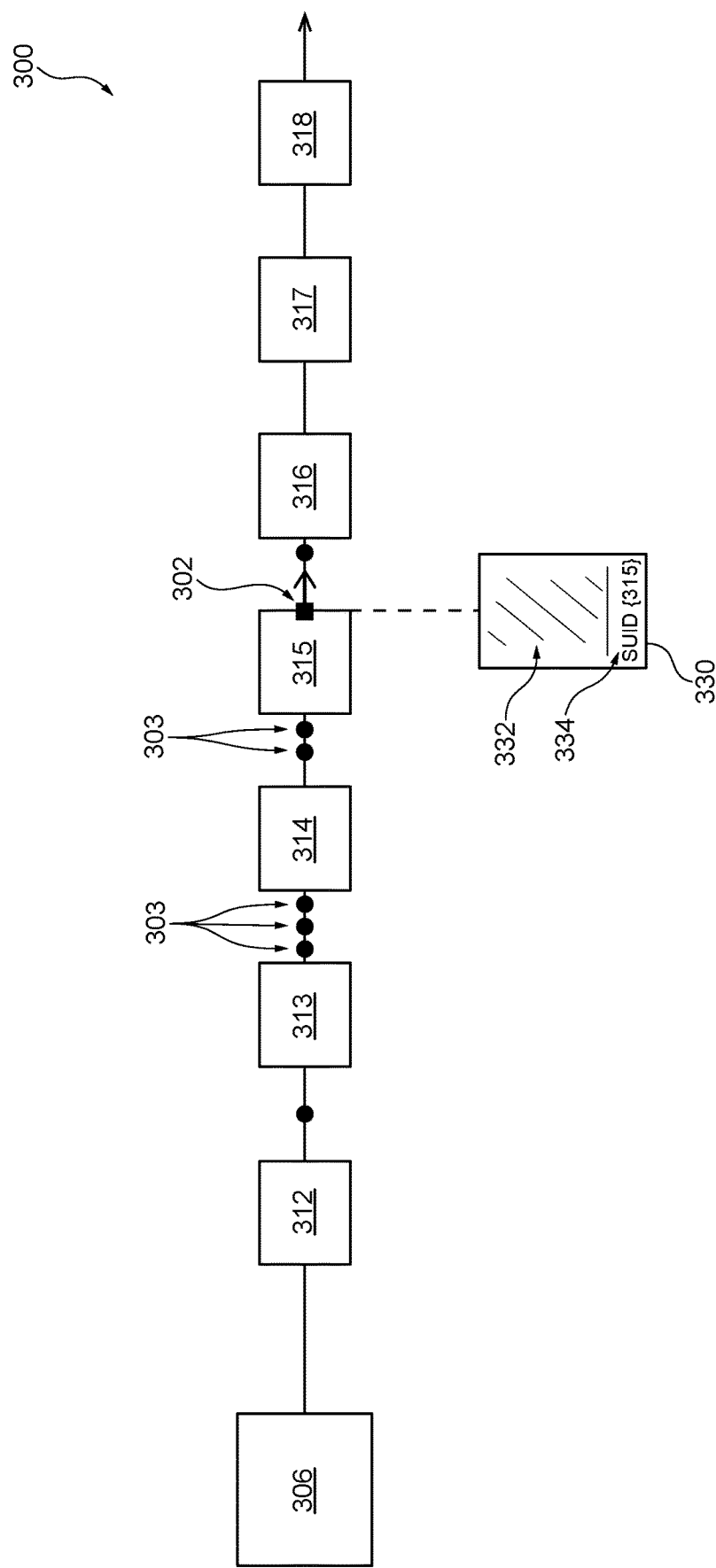

The node 315 receives and processes the task body 332 from the task packet 330. Once the task body 332 has been processed, the processing node 315 then similarly determines that there is a queue of computer-implemented tasks 303 waiting to be processed by the 315, as is illustrated in FIG. 6. Having determined the presence of an input queue, the processing node 315 then updates the writable congestion-indicating field 334 with the SUID of the processing node 315, replacing the SUID of the processing node 314 that was previously there.

Figure 7:
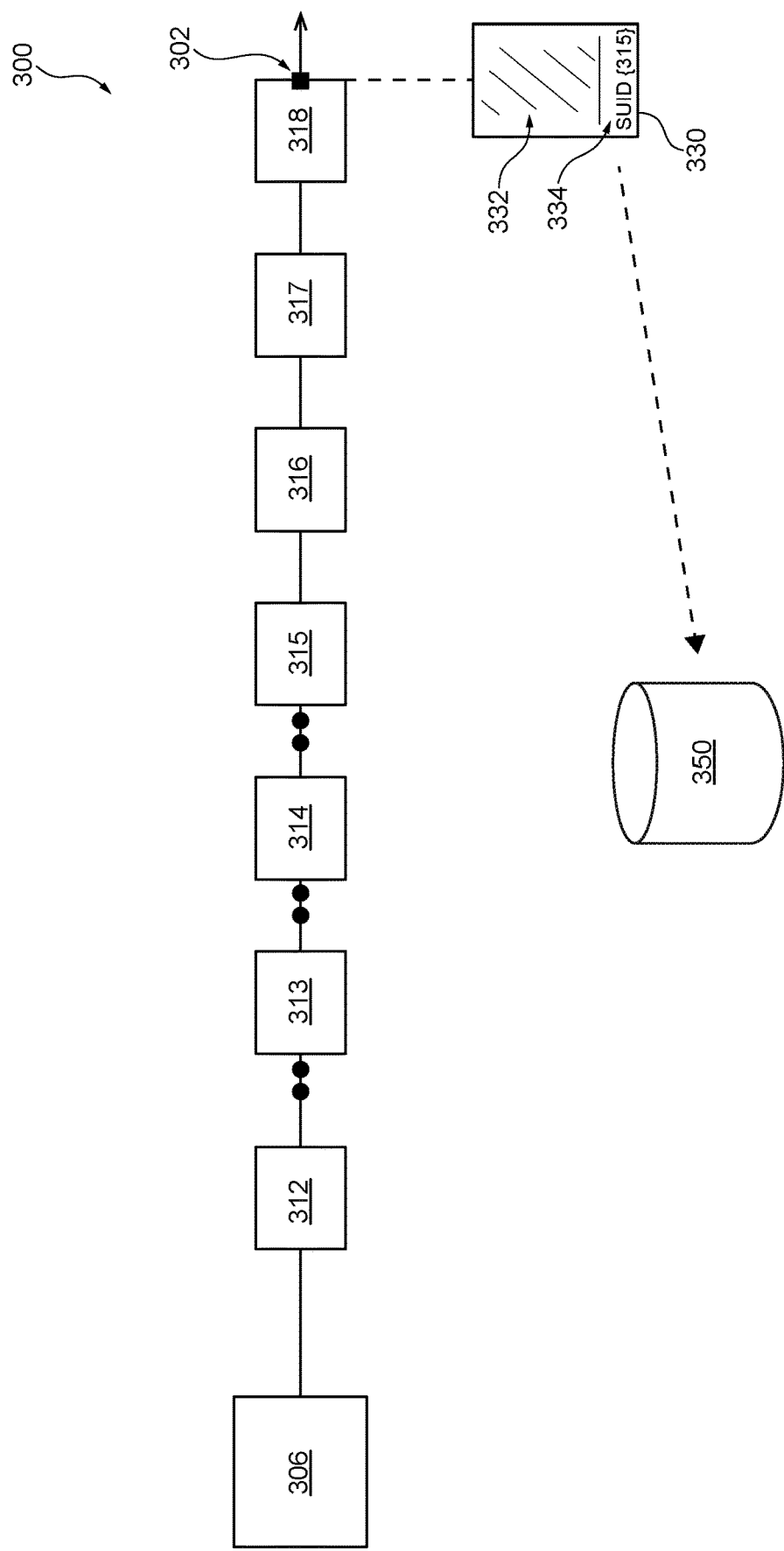

As is illustrated in FIG. 7, the computer-implemented task 302 then continues through processing nodes 316, 317, 318, without those nodes 312 detecting a queue. The task packet 330, upon exiting the processing pipeline 300, therefore still has the SUID of the processing node 315 saved to the writable congestion-indicating field 334. In this way, the task packet 330 has brought the information that the processing node 315 was the most down-stream processing node 312 causing congestion. By only retaining the most down-stream processing node 312 causing congestion in the writable congestion-indicating field 334, referred to herein as the last-written SUID, the amount of data needing to be carried with the task packet 330 is therefore limited.

The distributed processing system 100 then reads the writable congestion-indicating field 334 of the task packet 330 having exited the processing pipeline 300. In the present technology, the supervisory computer 350 reads the writable congestion-indicating field 334, although it is contemplated that other computer-implemented elements of the system 100 could read the congestion-indicating field 334.

The supervisory computer 350 then reads and records the last-written SUID in order to determine which processing node 312 is causing congestion in the processing pipeline 300. While the information in the writable congestion-indicating field 334 is sent to the supervisory computer 350 by the last processing node 312 of the pipeline 300 in the illustrated case, it is also contemplated that the supervisory computer 350 could retrieve the information from the node 312 or from another computer-implemented element of the system 100 at some later point in the processing.

In some implementations, the supervisory computer 350 then determines which particular node 312 corresponds to the last-written SUID. In the example of FIG. 7, the supervisory computer 350 reads the SUID in the task packet 330 and then determines that the node 315 had a queue and is potentially causing congestion in the processing pipeline 300. In some implementations, the supervisory computer 350 may only determine a node related to a most common last-written SUID in order to address only the node 312 that is most likely or most often causing congestion in the processing pipeline 300.

As will be described in more detail below, the distributed processing system 100 can then take steps to address the congestion caused by the most down-stream congestion causing node 312, based on the congestion statistics.

As can be noted from the above, only the SUID of the most down-stream node 312 that is determined to have queue is included in the task packet 330 exiting the processing pipeline 300. Irrespective of the nodes 312 upstream, the most down-stream node 312 determined to have a queue is causing a bottleneck of the pipeline 300 and will need to be addressed if the processing speed of the overall processing pipeline 300 is to be improved.

If, for example, the processing pipeline 300 has multiple nodes 312 causing congestion, the nodes 312 further upstream from the most down-stream node 312 causing congestion can be addressed after dealing with the most down-stream node 312. By changing parameters such that the node 312 determined to be causing the congestion no longer causes congestion, a node 312 upstream from the particular node 312 will become the new most down-stream node 312 causing congestion. In this way, the congestion-causing nodes 312 can be dealt with one at a time, while maintaining the simple, and low energy congestion identification of the present technology.

By only dealing with the most down-stream node 312 causing congestion, the present system and method further limits the amount of data that needs to be communicated in order to determine, identify, and resolve congestion in the processing pipeline 300. While it could, in some instances, be possible store all the SUIDs for all the nodes 312 having a queue, this would often not be ideal. In large processing pipelines 300 with many nodes 312, storing the SUID for every node 312 with a queue could amount to very large number of SUIDs to store. In some cases, the writable congestion-indicating field 334 may end up carrying more information than the original task body 332. Instead, by limiting the determination to the most down-stream congestion causing node 312, the task packet 330 can remain a small size, lending itself to rapid and low-energy processing (rather than the constant transfer of information-heavy packets from node to node).

Figure 8:
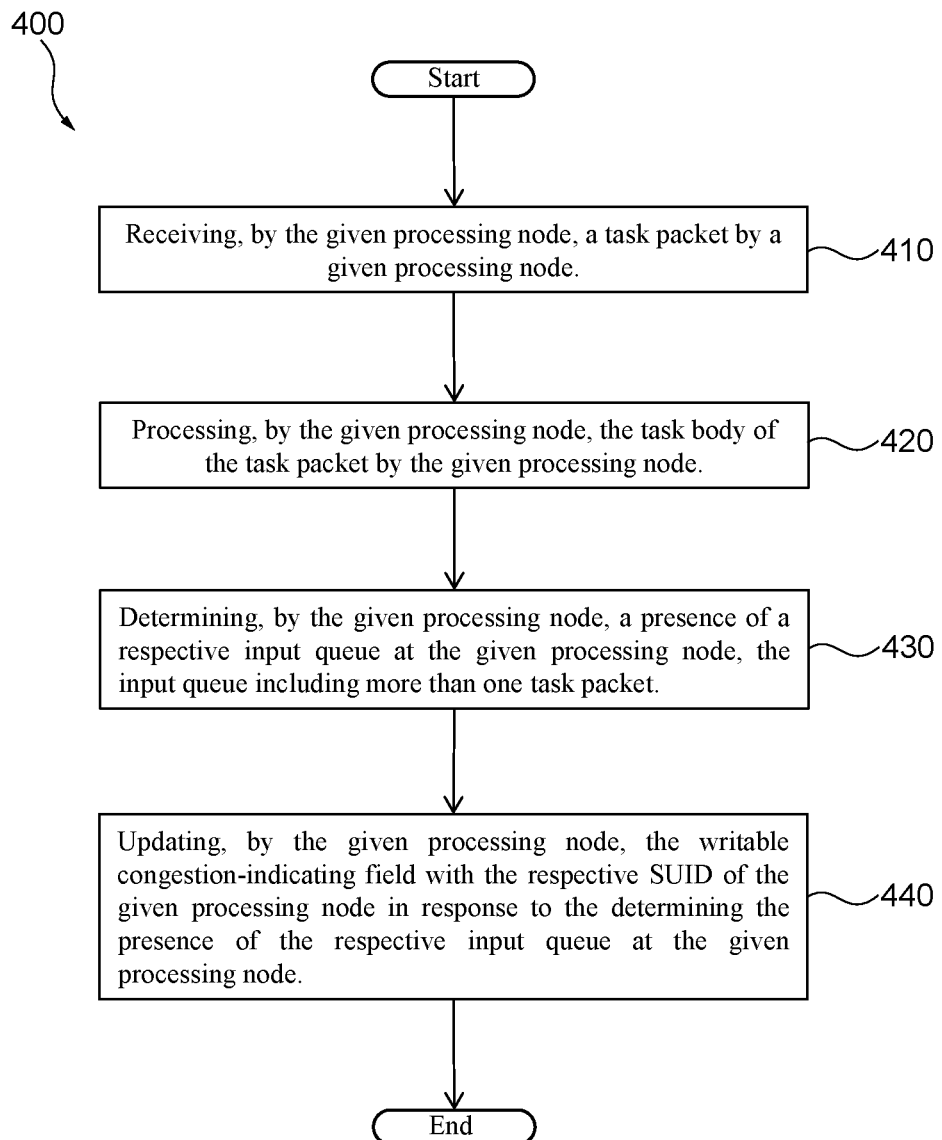
FIG. 8 is a flowchart of a method of detecting congestion in the processing pipeline of FIG. 3.
Figure 9:
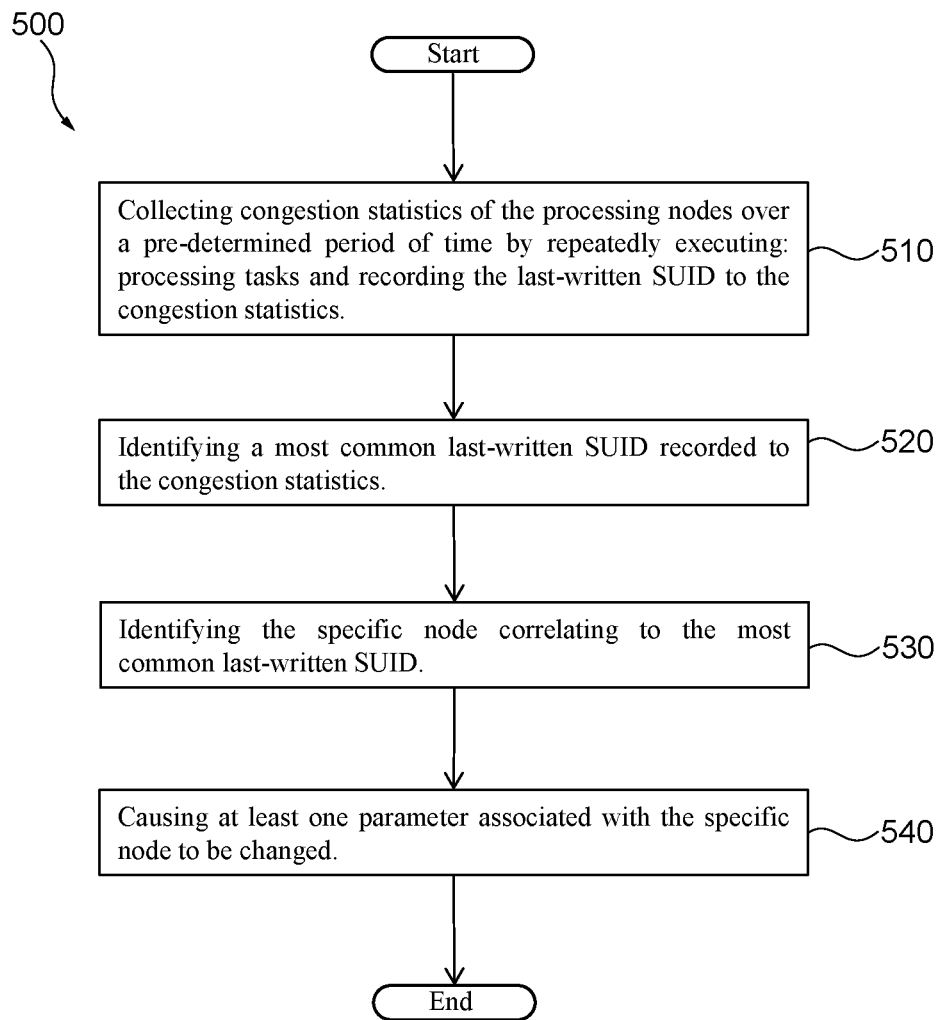
FIG. 9 is a flowchart of a method of resolving congestion in the processing pipeline of FIG. 3.

Given the architecture described above, it is possible to implement the method 400 for determining a point of congestion in the processing pipeline 300, as is generally described above. With reference to FIG. 8, the method 400 of detecting and identifying congestion in the processing pipeline 300 will now be described in more detail.

The method 400 is executed in accordance with the non-limiting embodiments of the present technology. The method 400 is carried out most generally by the distributed processing system 100 including the processing pipeline 300. Specifically, the method 400 is carried out by the processing nodes 312 and the supervisory computer 350, although it is contemplated that the method 400 could be carried out by various computer-implemented devices of the distributed processing system 100. It is further contemplated that the method could be carried out by a processing pipeline and supervisory computer that make up part of a different processing system, including non-distributed processing systems.

Step 410—Receiving, by a Given Processing Node of the Plurality of Processing Nodes, a Task Packet, the Given Processing Node being a Sequential Processing Node after a Previous Processing Node of the Processing Pipeline At step 410, a given processing node 312 receives a task packet 330 from a previous processing node 312 of the processing pipeline 300. If the node 312 is the first node 312 in the processing pipeline 300, the node 312 receives the task packet 330 from the task source 306. As is mentioned above, the task packet 330 includes at least the task body 332, which includes the information necessary for processing the computer-implemented task 302. In some implementations, the given processing node 312 simply receives the task body 332, and generates the task packet 330.

Step 420—Processing, by the Given Processing Node, the Task Body of the Task Packet At step 420, the given processing node 312 processes the task body 332 of the task packet 330. As part of the processing, the processing node 312 could further update the task body 332. In some cases, for example, the processing node 312 could perform an operation on data contained in the task body 332, and replace the information in the task body 332 with the resultant information after the operation (which then becomes the updated task body 332).

Step 430—Determining, by the Given Processing Node, a Presence of a Respective Input Queue at the Given Processing Node, the Input Queue Comprising More than one Task Packet At step 430, the given processing node 312 determines if there is an input queue at the given processing node 312. The input queue is defined as the presence of more than one task packet 330 awaiting processing by the given processing node 312.

The method used for determining the presence of the input queue can be any known in the art, and is not meant to be limiting in the present technology. Further, it is simply the presence of the input queue that is determined, without regard to the number of computer-implemented tasks 302 in the queue, time spent by the computer-implemented tasks 302 in the queue, nor the place of any particular computer-implemented task 302 in the queue.

Generally, the determining the presence of the respective input queue, at step 430, is executed after the processing of the task body by the given processing node 312 at step 420. In this way, any queue formed during the processing of the task packet 330 is detected and signaled. It is contemplated, however, that step 430 of determining the presence of a queue at the given processing node 312 could take place before the step 420 of processing the task body 332 by the given processing node 312. It is also contemplated that the step 430 of determining the presence of a queue at the given processing node 312 could take place concurrently with the step 420 of processing the task body 332 by the given processing node 312. This will generally not be the case however, as determining the queue first and then processing the task body 332 could lead to erroneously not identifying a queue which forms during processing of the task body 332 where there was not one previously.

Step 440—in Response to the Determining the Presence of the Respective Input Queue at the Given Processing Node, Updating, by the Given Processing Node, the Writable Congestion-Indicating Field with the Respective SUID of the Given Processing Node At step 440, having determined the presence of the input queue at the given processing node 312, the node 312 updates the writable congestion-indicating field 334 with the respective SUID of the given processing node 312. The task packet 330 then contains the unique identifier of the node 312 where the queue has been detected.

If an input queue was determined to be present at a previous node 312, and the SUID of the previous node 312 was written to the congestion-indicating field 334, updating the writable congestion-indicating field 334 would include deleting the previous SUID in the writable congestion-indicating field 334 and replacing it with the SUID of the current node 312. Where the given node 312 is the first node 312 in the pipeline 300 to determine that there is an input queue, updating the writable congestion-indicating field 334 includes writing the present SUID to the writable congestion-indicating field 334.

In some implementations, the given processing node 312 simply receives the task body 332, and generates the task packet 330, as is mentioned above. The generating the task packet 330 includes generating the writable congestion-indicating field 334 and appending the writable congestion-indicating field 334 to the task body 332. In some cases, the first processing node 312 could generate and append the writable congestion-indicating field 334 to the task body 332, upon receiving the task body 332 from the task source 306. In some cases, the first node 312 detecting a queue could generate and append the writable congestion-indicating field 334 to the task body 332.

The processing node 312 would then further insert the respective SUID of that processing node 312 into the writable congestion-indicating field 334, in response to the determining the presence of the input queue at that respective processing node 312.

In some implementations, the method 400 further includes recording the last-written SUID, corresponding to the most down-stream node 312 causing congestion, of all or many of the exiting task packets 330 over a pre-determined time. Depending on the particular implementation, the recording could be performed by the supervisory computer 350, or another computer-implemented element of the system 100.

In some implementations, the method 400 further includes identifying, by the distributed processing system 100, a most common last-written SUID amongst last-written SUIDs tracked over the pre-determined period of time. It is contemplated, similarly, that the supervisory computer 350 could identify the most common last-written SUID.

In some cases, the system 100 could further produce a message, including the most common last-written SUID, to alert either a user, another computer system, or one of the computer-implemented elements of the system 100 to the processing node 312 which is causing congestion in the processing pipeline 300. The message is directed to aiding in resolving congestion caused by a particular processing node 312 by identifying the most common last-written SUID, and therefore the node 312 that is most often causing congestion in the processing pipeline 300.

In some implementations of the distributed processing system 100, many processing pipelines 300 could be present. In such a case, the method 400 could further include recording, by the supervisory computer 350 or another element of the system 100, indications of last-written SUIDs of task packets 330 exiting each of processing pipelines 300 over the pre-determined period of time. In this way, any or all of the processing pipelines 300 can be optimized to manage congestion across the system 100.

Figure 10:
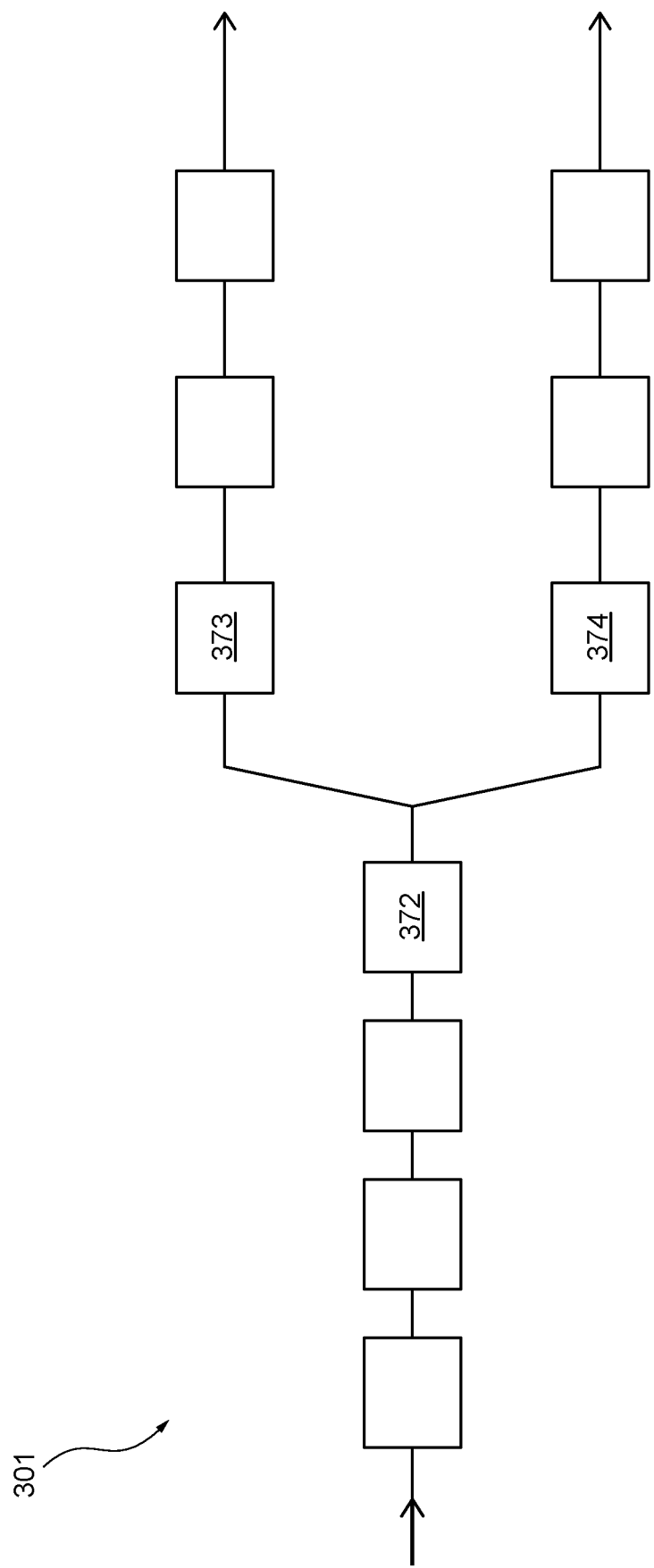
FIG. 10 is a schematic illustration of another embodiment of a processing pipeline utilized in the system of FIG. 1.

Given the architecture of the processing pipeline 300 and the distributed processing system 100, as well as the method 400 of determining congestion described above, it is possible to implement a method 500 of resolving congestion in the processing pipeline 300. With reference to FIG. 10, the method 500 of resolving congestion in the processing pipeline 300 will now be described in more detail.

The method 500 is executed in accordance with the non-limiting embodiments of the present technology. The method 500 is carried out most generally by the distributed processing system 100 including the processing pipeline 300. Specifically, the method 500 is carried out by the processing nodes 312 and the supervisory computer 350, although it is contemplated that the method 500, or parts thereof, could be carried out by various computer-implemented devices of the distributed processing system 100. It is further contemplated that such a method could be carried out by a processing pipeline and supervisory computer belonging to non-distributed processing systems.

Step 510—Collecting Congestion Statistics of the Plurality of Processing Nodes over a Pre-Determined Period of Time, the Collecting being Executed by Repeating, over the Pre-Determined Period of Time, the Steps of Processing Tasks and Recording the Last-Written SUID to the Congestion Statistics At step 510, the supervisory computer 350 collects congestion statistics over a pre-determined time by repeatedly recording the last-written SUIDs from a plurality of computer-implemented tasks 302 having been processed by the processing pipeline 300.

The last-written SUIDs from the plurality of computer-implemented tasks 302 are recorded during iterations of the method 400, described above, with the last-written SUID being recorded for many or each of the computer-implemented tasks 302 produced by the task source 306 and processed by the processing pipeline 300.

Step 520—Identifying, by the Supervisory Computer, a Most Common Last-Written sUID Recorded to the Congestion Statistics At step 520, the supervisory computer 350 identifies a most common last-written SUID that has been recorded to the congestion statistics. The most common last-written SUID is indicative of the most-downstream processing node 312 of the plurality of processing nodes 312 most often causing congestion in the processing pipeline 300 during the pre-determined period of time during which the computer 350 has been collecting the congestion statistics.

In some cases, congestion statistics could be kept for more than one processing pipeline 300 in the system, and the supervisory computer 350 could identify the most common last-written SUIDs in each pipeline 300, or just a subset of the processing pipelines 300.

Step 530—Identifying the Specific Node Correlating to the Most Common Last-Written SUID At step 530, the supervisory computer 350 identifies the specific node 312 that correlates to the most common last-written SUID. In some cases, the identifying could include comparing the most common last-written SUID to a table of SUIDs and nodes 312.

Step 540—Causing at Least One Parameter Associated with the Specific Node to be Changed At step 540, the supervisory computer 350 then causes at least one parameter associated with the specific node 312 to be changed, in order to aid in resolving the congestion caused by the specific node 312. In some implementations, the supervisory computer 350 can identify the specific node 312 to some other computer-implemented element of the system 100. The other computer-implemented element can then adjust one or more parameters of the specific node 312 to aid in reducing the congestion caused by the specific node 312.

With reference to FIG. 10, another non-limiting example of a processing pipeline 301 will be described, the processing pipeline 301 having at least three nodes 372, 373, 374 which are examples of the node 312. It is noted that additional information may be necessary to identify the most down-stream congestion causing node 312 in processing pipelines 301 that include branches.

In the illustrated processing pipeline 301, the node 372 can direct task packets 330 to two possible nodes 373 and 374. Depending on the interaction between the nodes 372, 373, 374, a queue at either of nodes 373 and/or 374 may not depend only on parameters of the nodes 373, 374. In some cases, management of the node 372 could also influence the queues at nodes 373, 374. For example, the node 373 could be processing fasting than the node 374, but if the node 372 directs more task packets 330 to the node 373, a queue is more likely to form at the node 373.

In order to avoid incorrect interpretation of queues formed at branches in the processing pipeline 301, such as that illustrated with nodes 372, 373, 374, additional information can be supplied in some implementations. In some cases, in addition to updating the writable congestion-indicating field 334 when a given node 312 determines that it has an input queue, the given node 312 could further update the writable congestion-indicating field 334 with an indication that the queue at the given node 312 has dissipated. In other non-limiting embodiments of the present technology, the given node 312 can generate a separate message indicative of the fact that the queue at the given node 312 has dissipated.

In some cases, the indication that the queue at the given node 312 has dissipated could be included as additional information in the writable congestion-indicating field 334. In some other implementations, the indication that the queue at the given node 312 has dissipated could simply be used to replace the SUID from a previous node 312 in the writable congestion-indicating field 334. In such a case, if any nodes 312 down-stream from the branch nodes 373, 374 determine a respective queue, the SUID of the down-stream node will simply replace the indication from the branch nodes 373, 374. The queue at the branch nodes 373, 374, whether caused by the branch nodes 373, 374 or by distribution by the node 372, would then be rendered moot. On the other hand, where the branch nodes 373, 374 are the most down-stream nodes 312 to have an input queue, the system 100 will receive the additional information that the queue has been dissipated, and that information can be taken into account when determining if the congestion at the branch nodes 373, 374 needs to be addressed.

As is noted above, while the processing pipeline 300 described herein is applicable to the distributed processing system 100, the technology described herein is also applicable to different types of computer-implemented systems and should not be limited to distributed processing systems. Many systems involving a data processing pipeline could benefit from the present technology, including, but not limited to: Central Processing Unit (CPU) processing, hardware-implemented processing, communication networks, and state machines.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of detecting congestion in a computer system, the computer system having:
  (i) a task source for generating a stream of computer-implemented tasks to be processed by the computer system, and
  (ii) a plurality of processing nodes arranged in a sequence and forming a processing pipeline for processing the stream of computer-implemented tasks, each one of the plurality of processing nodes having a respective system-unique identifier (SUID),
the method being executable by the computer system, the method comprising:
  receiving, by a given processing node of the plurality of processing nodes, a task packet, the given processing node being a sequential processing node after a previous processing node of the processing pipeline, the task packet having:
    (i) a task body indicative of a respective computer-implemented task, and
    (ii) a writable congestion-indicating field;
  processing, by the given processing node, the task body of the task packet;
  determining, by the given processing node, a presence of a respective input queue at the given processing node, the input queue comprising more than one task packet, wherein the determining the presence of the respective input queue is executed after the processing of the task body by the given processing node; and
  in response to the determining the presence of the respective input queue at the given processing node, updating, by the given processing node, the writable congestion-indicating field with the respective SUID of the given processing node.

2. The method of claim 1, wherein the method further comprises:
- processing, by the previous processing node, the task packet, the processing comprising:
  - generating, by the previous processing node, the writable congestion-indicating field; and
  - appending, by the previous processing node, the writable congestion-indicating field to the task body.

3. The method of claim 2, wherein the processing the task packet further comprises:
- determining, by the previous processing node, a presence of a respective input queue at the previous processing node; and
- in response to the determining the presence of the respective input queue at the previous processing node, inserting, by the previous processing node, into the writable congestion-indicating field the respective SUID of the previous processing node.

4. The method of claim 3, wherein the generating, by the previous processing node, the writable congestion-indicating field is executed only in response to the determining the presence of the respective input queue at the previous processing node.

5. The method of claim 1, wherein the method further comprises:
- receiving, by a next processing node of the plurality of processing nodes, the task packet, the next processing node being a sequential processing node after the given processing node of the processing pipeline;
- processing, by the next processing node, the task body of the task packet;
- determining, by the next processing node, a presence of a respective input queue at the next processing node; and
- in response to the determining the presence of the respective input queue at the next processing node, updating, by the next processing node, the writable congestion-indicating field with the respective SUID of the next processing node.

6. The method of claim 5, wherein the method further comprises:
- reading, by the computer system, the writable congestion-indicating field of the task packet having exited the processing pipeline, thereby identifying a last-written SUID having been written into the writable congestion-indicating field,
  - the last-written SUID being indicative of a most-downstream processing node of the plurality of processing nodes causing congestion in the processing pipeline.

7. The method of claim 6, wherein the method further comprises:
- recording over a pre-determined period of time, by the computer system, indications of last-written SUIDs of task packets having exited the processing pipeline.

8. The method of claim 7, wherein the method further comprises:
- identifying, by the computer system, a most common last-written SUID amongst tracked last-written SUIDs; and
- generating, by the computer system, a message including the most common last-written SUID, the message aiding in resolving congestion caused by a respective processing node associated with the most common last-written SUID.

9. The method of claim 5, wherein:
- the computer system further comprises a supervisory computer; and the method further comprises:
- reading, by the supervisory computer, the writable congestion-indicating field of the task packet having exited the processing pipeline, thereby identifying a last-written SUID having been written into the writable congestion-indicating field,
  - the last-written SUID being indicative of a most-downstream processing node of the plurality of processing nodes causing congestion in the processing pipeline.

10. The method of claim 9, wherein:
the computer system further comprises a plurality of processing pipelines; and
the method further comprises:
- recording over a pre-determined period of time, by the supervisory computer, indications of last-written SUIDs of task packets exiting each one of the plurality of processing pipelines.

11. The method of claim 1, wherein the plurality of processing nodes comprises at least one of:
- a plurality of software-implemented nodes,
- a plurality of hardware-implemented nodes, and
- a plurality of storage devices.

12. A method of resolving congestion caused by a specific processing node in a computer system, the computer system comprising:
- a plurality of processing nodes organized in series for sequential processing, each one of the plurality of nodes having a system-unique identifier (SUID), a task source for generating a plurality of computer-implemented tasks to be processed by the plurality of nodes, and
- a supervisory computer,
  - the method being executable at the supervisory computer,
  - the method comprising:
    - collecting congestion statistics of the plurality of processing nodes over a pre-determined period of time, the collecting being executed by repeating, over the pre-determined period of time, the steps of:
      - receiving, by a given processing node of the plurality of processing nodes, a task packet, the given processing node being a sequential processing node after a previous processing node of the processing pipeline, the task packet having:
        - (i) a task body indicative of a respective computer-implemented task, and
        - (ii) a writable congestion-indicating field;
      - processing, by the given processing node, the task body of the task packet;
      - determining, by the given processing node, a presence of a respective input queue at the given processing node, the input queue comprising more than one task packet;
      - in response to the determining the presence of the respective input queue at the given processing node, updating, by the given processing node, the writable congestion-indicating field with the respective SUID of the given processing node;
      - receiving, by a next processing node of the plurality of processing nodes, the task packet, the next processing node being a sequential processing node after the given processing node of the processing pipeline;

processing, by the next processing node, the task body of the task packet;

determining, by the next processing node, a presence of a respective input queue at the next processing node; and in response to the determining the presence of the respective input queue at the next processing node, updating, by the next processing node, the writable congestion-indicating field with the respective SUID of the next processing node;

reading, by the supervisory computer, the writable congestion-indicating field of the task packet having exited the processing pipeline, thereby identifying a last-written SUID having been written into the writable congestion-indicating field, the last-written SUID being indicative of a most-downstream processing node of the plurality of processing nodes causing congestion in the processing pipeline; and recording the last-written SUID to the congestion statistics;

identifying, by the supervisory computer, a most common last-written SUID recorded to the congestion statistics;

identifying the specific node associated with the most common last-written SUID; and causing at least one parameter associated with the specific node to be changed.

13. The method of claim 12, wherein the determining the presence of the respective input queue is executed after the processing of the task body by the given processing node.

14. The method of claim 12, wherein the plurality of processing nodes comprises at least one of:
a plurality of software-implemented nodes,
a plurality of hardware-implemented nodes, and
a plurality of storage devices.

15. The method of claim 12, wherein the identifying the most common last-written SUID recorded to the congestion statistics comprises identifying a most frequently recorded last-written SUID over the pre-determined period of time.

16. A method of detecting congestion in a computer system, the computer system having:
(i) a plurality of processing nodes arranged in a sequence and forming a processing pipeline for processing a stream of computer-implemented tasks generated by a task source,
(ii) each one of the plurality of processing nodes having a respective system-unique identifier (SUID),
the method being executable at the computer system, the method comprising:
collecting congestion statistics of the plurality of processing nodes over a pre-determined period of time, the collecting being executed by repeating, over the pre-determined period of time, the steps of:
receiving, by a given processing node of the plurality of processing nodes, a task packet, the given processing node being a sequential processing node after a previous processing node of the processing pipeline,
the task packet having:
(iii) a task body indicative of a respective computer-implemented task, and
(iv) a writable congestion-indicating field;
processing, by the given processing node, the task body of the task packet;
determining, by the given processing node, a presence of a respective input queue at the given processing node, the input queue comprising more than one task packet;
in response to the determining the presence of the respective input queue at the given processing node, updating, by the given processing node, the writable congestion-indicating field with the respective SUID of the given processing node;
receiving, by a next processing node of the plurality of processing nodes, the task packet, the next processing node being a sequential processing node after the given processing node of the processing pipeline;
processing, by the next processing node, the task body of the task packet;
determining, by the next processing node, a presence of a respective input queue at the next processing node; and
in response to the determining the presence of the respective input queue at the next processing node, updating, by the next processing node, the writable congestion-indicating field with the respective SUID of the next processing node;
reading, by the computer system, the writable congestion-indicating field of the task packet having exited the processing pipeline, thereby identifying a last-written SUID having been written into the writable congestion-indicating field, the last-written SUID being indicative of a most-downstream processing node of the plurality of processing nodes causing congestion in the processing pipeline; and
recording the last-written SUID to the congestion statistics;
identifying, by the computer system, a most common last-written SUID recorded to the congestion statistics;
identifying the specific node associated with the most common last-written SUID; and
causing at least one parameter associated with the specific node to be changed.

17. The method of claim 16, wherein the determining the presence of the respective input queue is executed after the processing of the task body by the given processing node.

18. The method of claim 16, wherein the plurality of processing nodes comprises at least one of:
a plurality of software-implemented nodes,
a plurality of hardware-implemented nodes, and
a plurality of storage devices.

19. The method of claim 16, wherein the identifying the most common last-written SUID recorded to the congestion statistics comprises identifying a most frequently recorded last-written SUID over the pre-determined period of time.

* * * * *